United States Patent [19]

Steutermann

[11] Patent Number: 4,914,566
[45] Date of Patent: Apr. 3, 1990

[54] SHAFT POSITION DETECTOR AND CONTROL DEVICE

[76] Inventor: Edward M. Steutermann, 13305 Laurel Ct., Prospect, Ky. 40059

[21] Appl. No.: 398,383

[22] Filed: Aug. 24, 1989

Related U.S. Application Data

[63] Continuation-in-part of Ser. No. 368,138, Jun. 14, 1989, which is a continuation-in-part of Ser. No. 258,165, Oct. 14, 1988, abandoned, which is a continuation-in-part of Ser. No. 78,639, Jul. 28, 1987, abandoned, which is a continuation-in-part of Ser. No. 917,419, Oct. 10, 1986, abandoned, which is a continuation-in-part of Ser. No. 653,288, Sep. 24, 1984, abandoned.

[51] Int. Cl.$^4$ .................. G05B 11/00; G01R 33/00
[52] U.S. Cl. .................. 364/167.01; 364/183; 318/601; 251/129.01; 251/129.05
[58] Field of Search .................. 364/167.01, 183; 251/129.01–129.22; 318/599–603

[56] References Cited

U.S. PATENT DOCUMENTS

| | | |
|---|---|---|
| 3,155,955 | 11/1964 | Davidson et al. ............... 340/870.27 |
| 3,584,203 | 6/1971 | Patzelt et al. ............... 364/183 |
| 3,622,766 | 11/1971 | David et al. ............... 364/183 |
| 3,752,969 | 8/1973 | Kiffmeyer et al. ............... 364/183 |
| 3,942,718 | 4/1976 | Palmieri ............... 364/183 |
| 3,976,963 | 8/1976 | Kubler ............... 335/206 |
| 4,068,163 | 1/1978 | Foxworthy ............... 324/207 |
| 4,312,033 | 1/1982 | Sweeney et al. ............... 364/167 |
| 4,356,554 | 10/1982 | Susnjara et al. ............... 364/183 |
| 4,417,312 | 11/1983 | Cronin et al. ............... 364/183 |

Primary Examiner—Allen MacDonald
Attorney, Agent, or Firm—Edward M. Steutermann

[57] ABSTRACT

Control and positioning devices wherein a digital position signal is generated indicative of the position of a moveable element between limits and is supplied to a comparator device and where a digital signal is also provided to the comparator device indicative of a selected position of the element where the comparator device compares the two digital signals and operates actuator device to move the element in a corrective direction toward the selected position where movement terminates upon arrival of the element at the selected position.

39 Claims, 12 Drawing Sheets

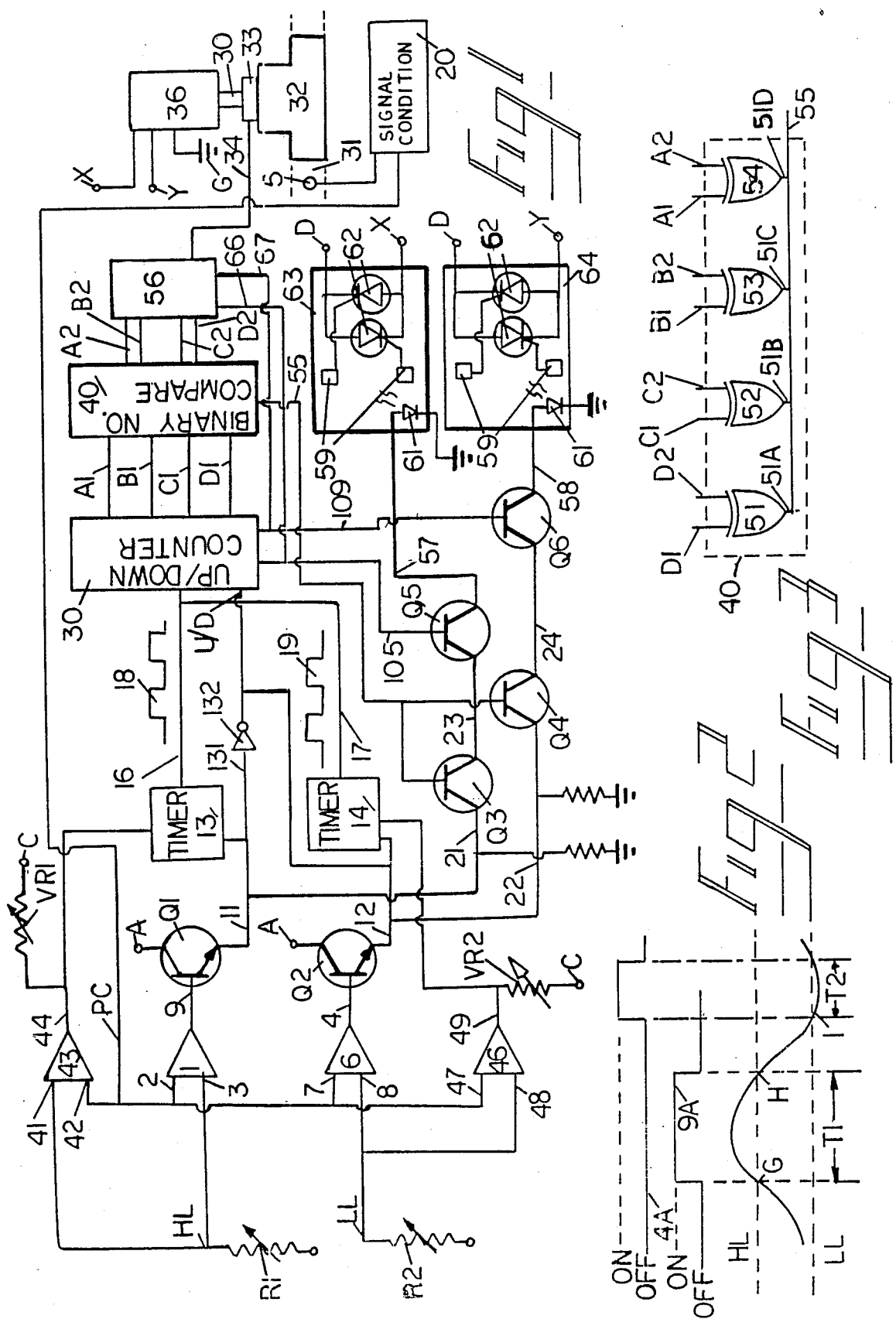

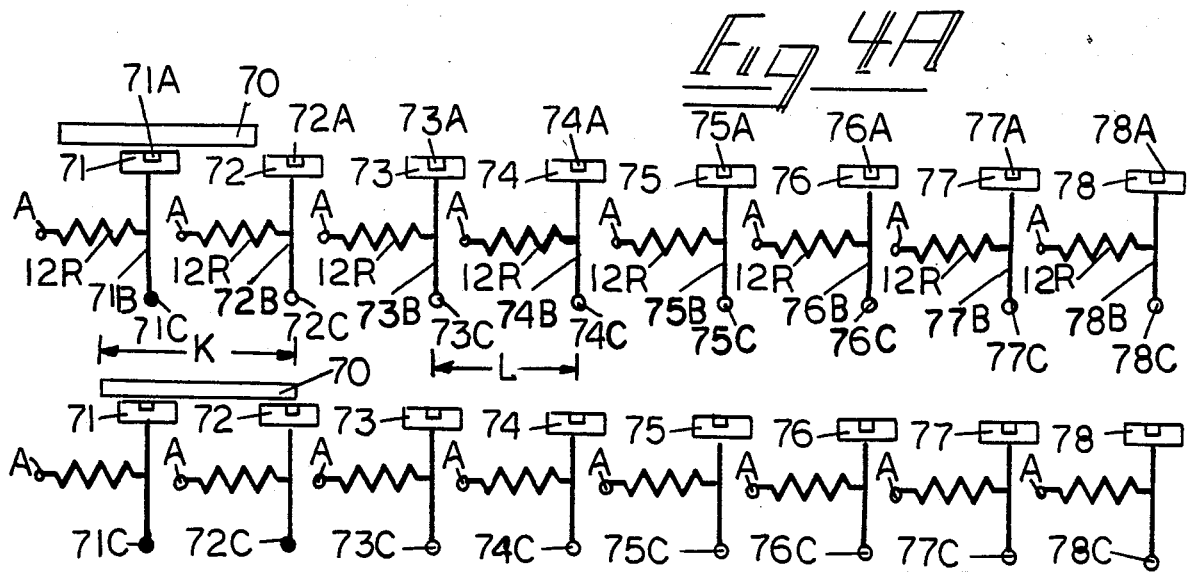
Fig 4A
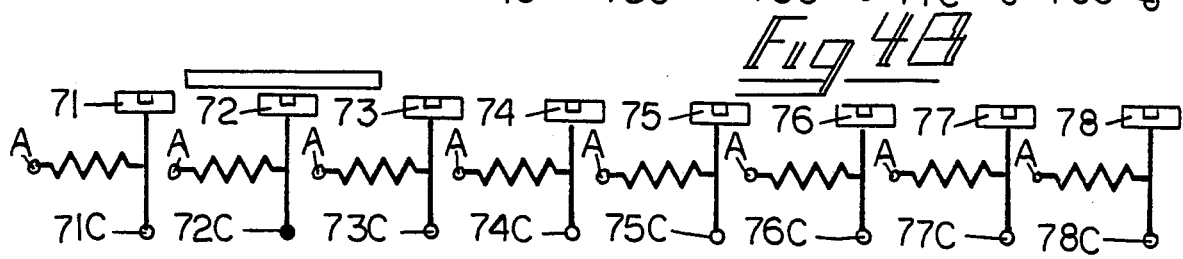
Fig 4B
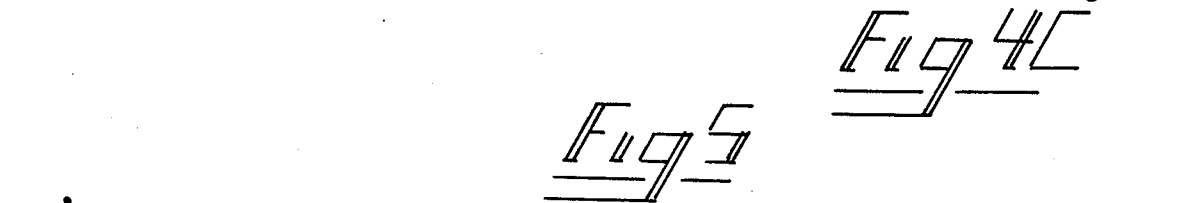
Fig 4C
Fig 5
| MAGNET POSITION | 71B A1 | 72B A2 | 73B A3 | 74B A4 | 75B A5 | 76B A6 | 77B A7 | 78B A8 | PROM OUTPUTS D2 | C2 | B2 | A2 |
|---|---|---|---|---|---|---|---|---|---|---|---|---|
| 0 | 0 | 1 | 1 | 1 | 1 | 1 | 1 | 1 | 0 | 0 | 0 | 0 |
| 1 | 0 | 0 | 1 | 1 | 1 | 1 | 1 | 1 | 0 | 0 | 0 | 1 |
| 2 | 1 | 0 | 1 | 1 | 1 | 1 | 1 | 1 | 0 | 0 | 1 | 0 |
| 3 | 1 | 0 | 0 | 1 | 1 | 1 | 1 | 1 | 0 | 0 | 1 | 1 |
| 4 | 1 | 1 | 0 | 1 | 1 | 1 | 1 | 1 | 0 | 1 | 0 | 0 |
| 5 | 1 | 1 | 0 | 0 | 1 | 1 | 1 | 1 | 0 | 1 | 0 | 1 |
| 6 | 1 | 1 | 1 | 0 | 1 | 1 | 1 | 1 | 0 | 1 | 1 | 0 |
| 7 | 1 | 1 | 1 | 0 | 0 | 1 | 1 | 1 | 0 | 1 | 1 | 1 |
| 8 | 1 | 1 | 1 | 1 | 0 | 1 | 1 | 1 | 1 | 0 | 0 | 0 |
| 9 | 1 | 1 | 1 | 1 | 0 | 0 | 1 | 1 | 1 | 0 | 0 | 1 |
| 10 | 1 | 1 | 1 | 1 | 1 | 0 | 1 | 1 | 1 | 0 | 1 | 0 |
| 11 | 1 | 1 | 1 | 1 | 1 | 0 | 0 | 1 | 1 | 0 | 1 | 1 |
| 12 | 1 | 1 | 1 | 1 | 1 | 1 | 0 | 1 | 1 | 1 | 0 | 0 |
| 13 | 1 | 1 | 1 | 1 | 1 | 1 | 0 | 0 | 1 | 1 | 0 | 1 |
| 14 | 1 | 1 | 1 | 1 | 1 | 1 | 1 | 0 | 1 | 1 | 1 | 0 |

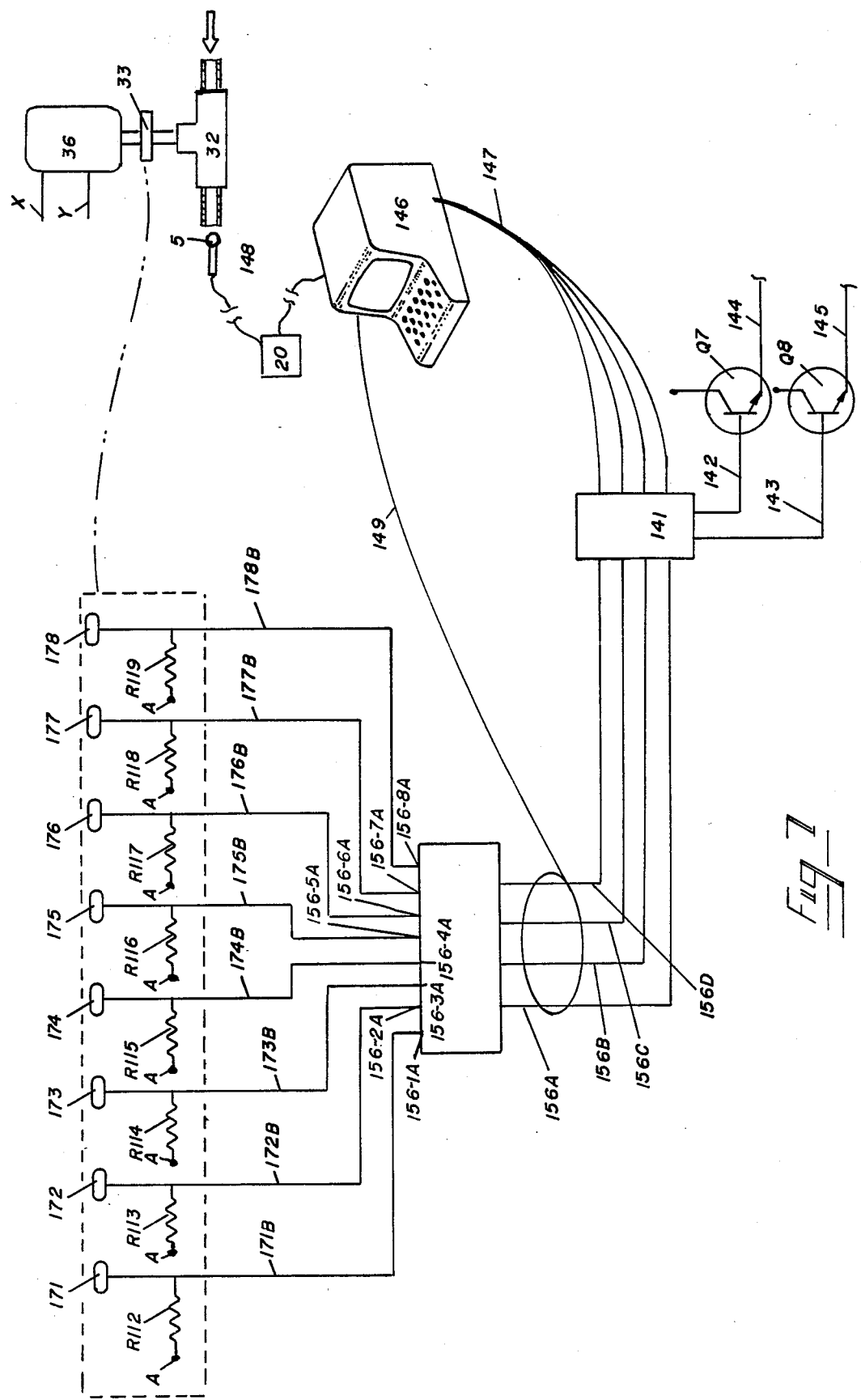

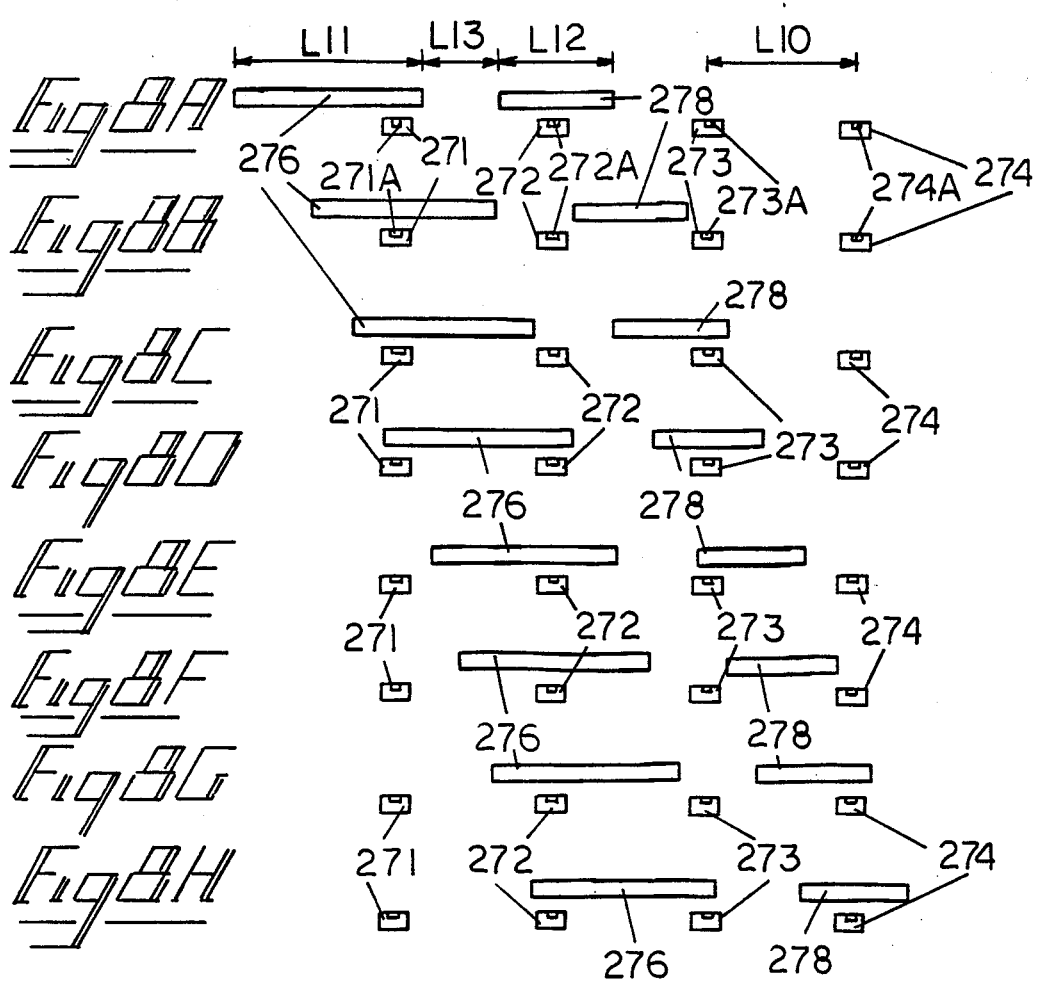
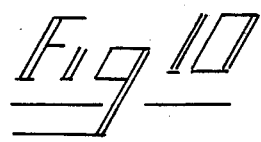
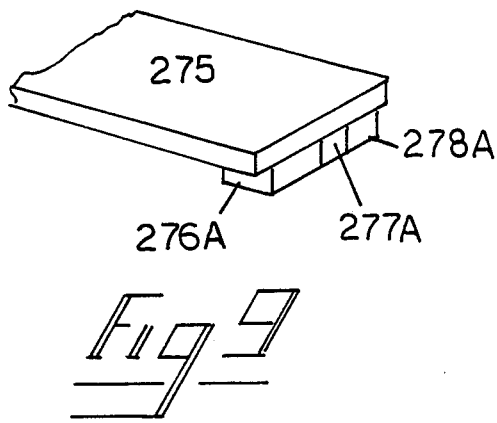

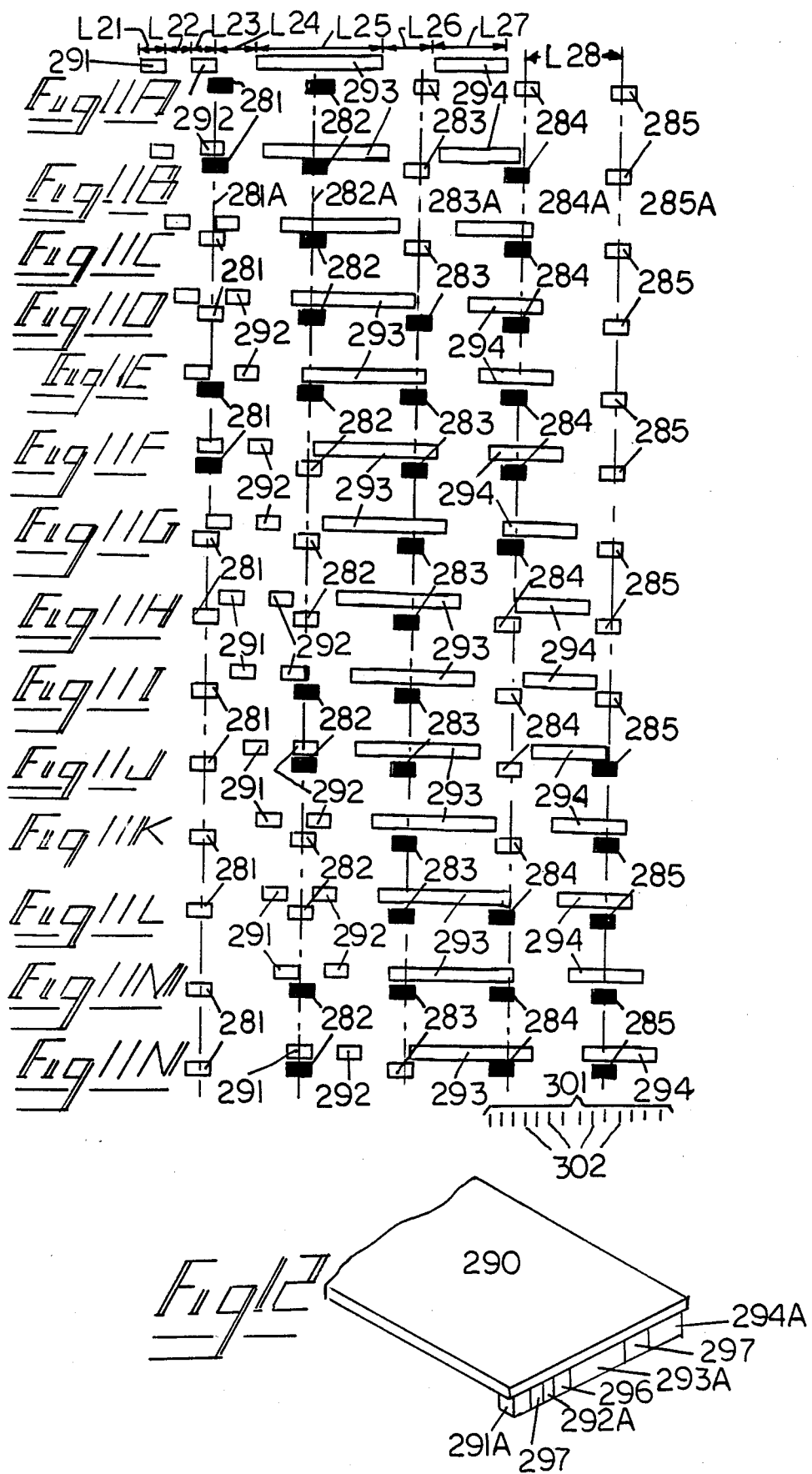

| POSITION | SENSOR STATE | | | | |
|---|---|---|---|---|---|
| | 281 | 282 | 283 | 284 | 285 |
| FIG 11A | X | X | | | |
| FIG 11B | X | X | | X | |
| FIG 11C | | X | | X | |
| FIG 11D | | X | X | X | |
| FIG 11E | X | X | X | X | |
| FIG 11F | X | | X | X | |
| FIG 11G | | | X | X | |
| FIG 11H | | | X | | |
| FIG 11I | | X | X | | |
| FIG 11J | | X | X | | X |
| FIG 11K | | | X | | X |
| FIG 11L | | | X | X | X |
| FIG 11M | | X | X | X | X |
| FIG 11N | | X | | X | X |

Fig 13

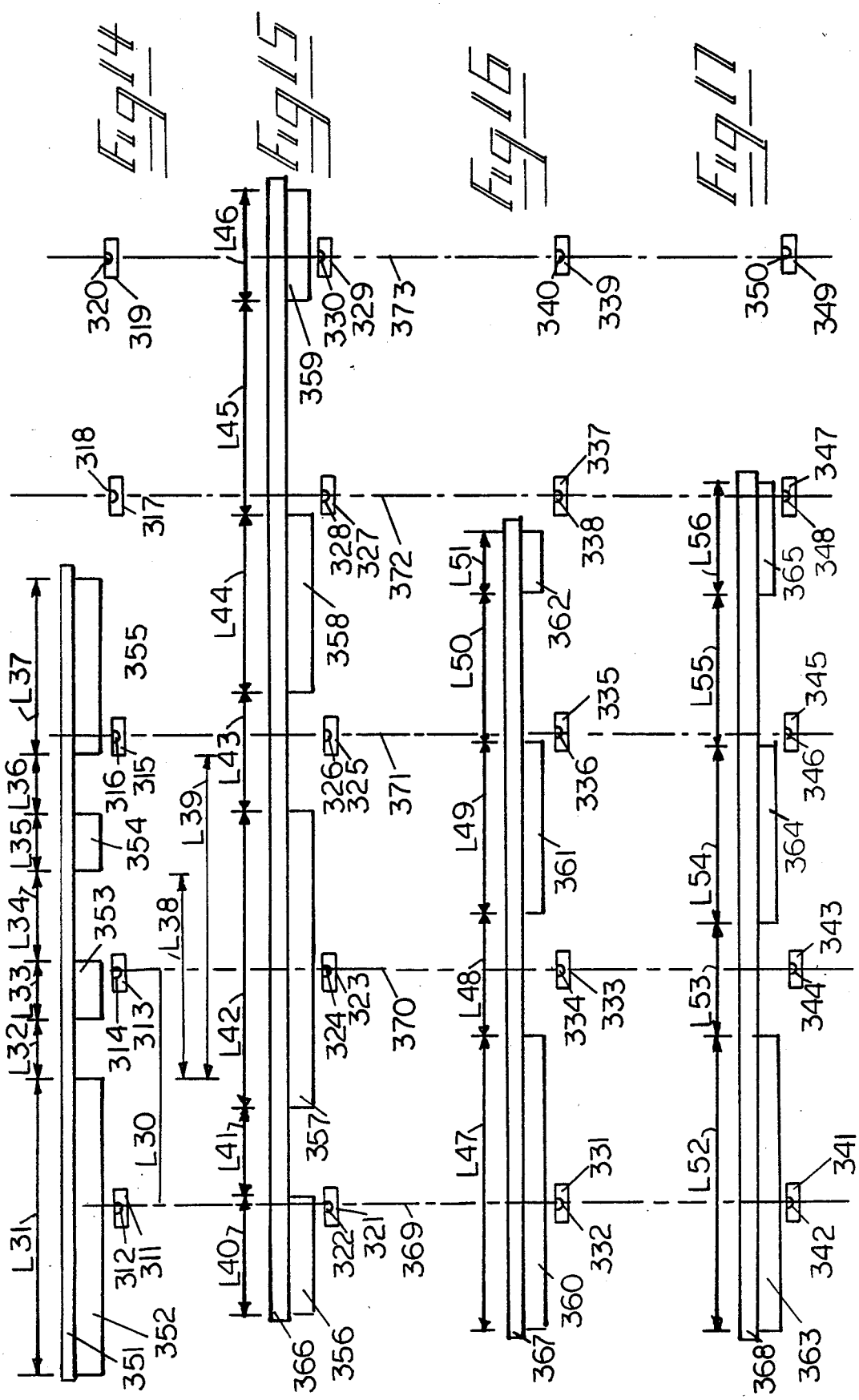

| SENSOR POSITION | 361 | 362 | 363 | 364 | 365 | 366 | 367 | 368 |
|---|---|---|---|---|---|---|---|---|
| FIG 20A | ON | OFF | OFF | OFF | OFF | OFF | OFF | OFF |
| FIG 20B | ON | OFF | OFF | OFF | ON | OFF | OFF | OFF |
| FIG 20C | ON | OFF | OFF | OFF | ON | ON | OFF | OFF |
| FIG 20D | ON | OFF | ON | ON | ON | OFF | OFF | OFF |
| FIG 20E | ON | ON | ON | ON | ON | OFF | OFF | OFF |
| FIG 20F | ON | ON | ON | OFF | ON | OFF | OFF | OFF |
| FIG 20G | OFF | ON | ON | OFF | ON | OFF | OFF | OFF |
| FIG 20H | OFF | ON | ON | OFF | OFF | OFF | OFF | OFF |
| FIG 20I | OFF | ON | OFF | OFF | OFF | OFF | OFF | OFF |
| FIG 20J | OFF | ON | OFF | OFF | OFF | ON | OFF | OFF |

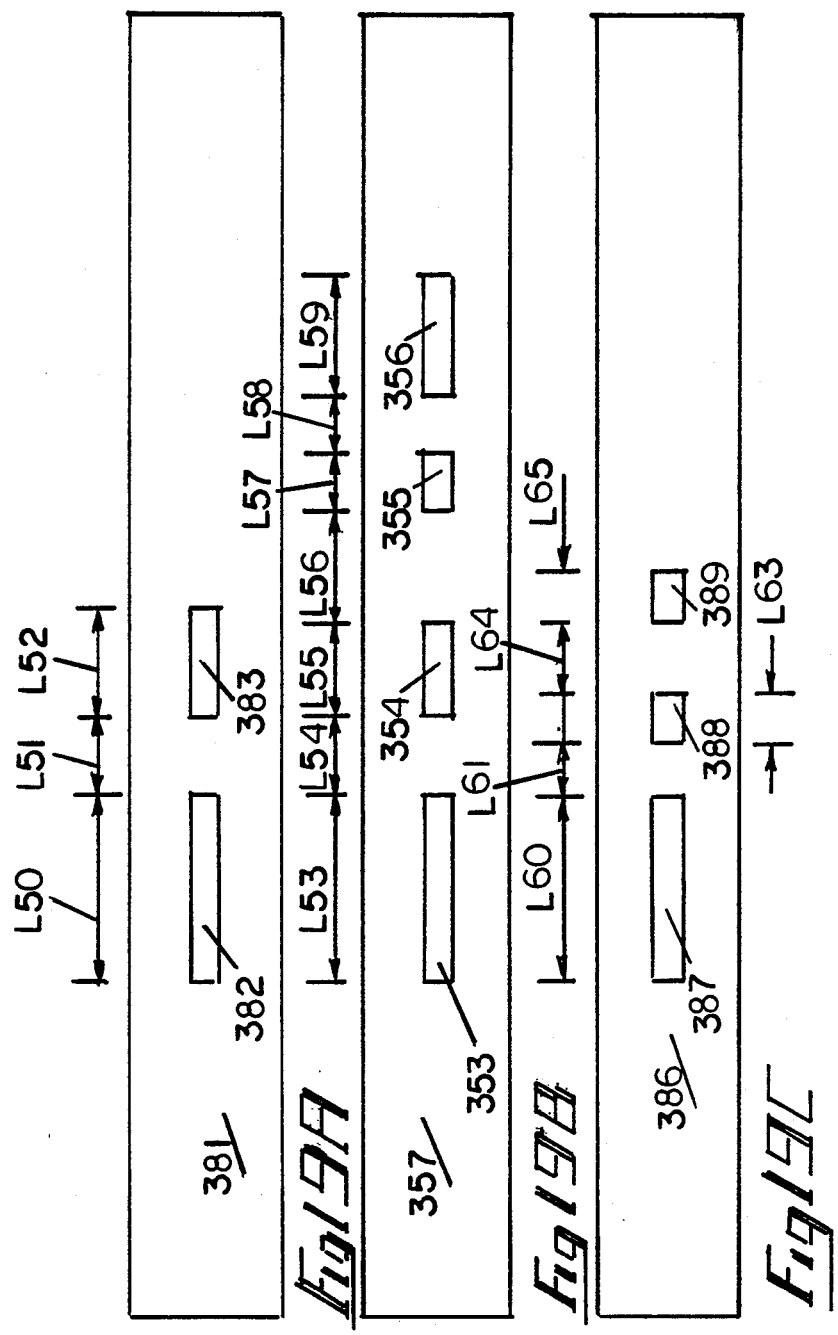

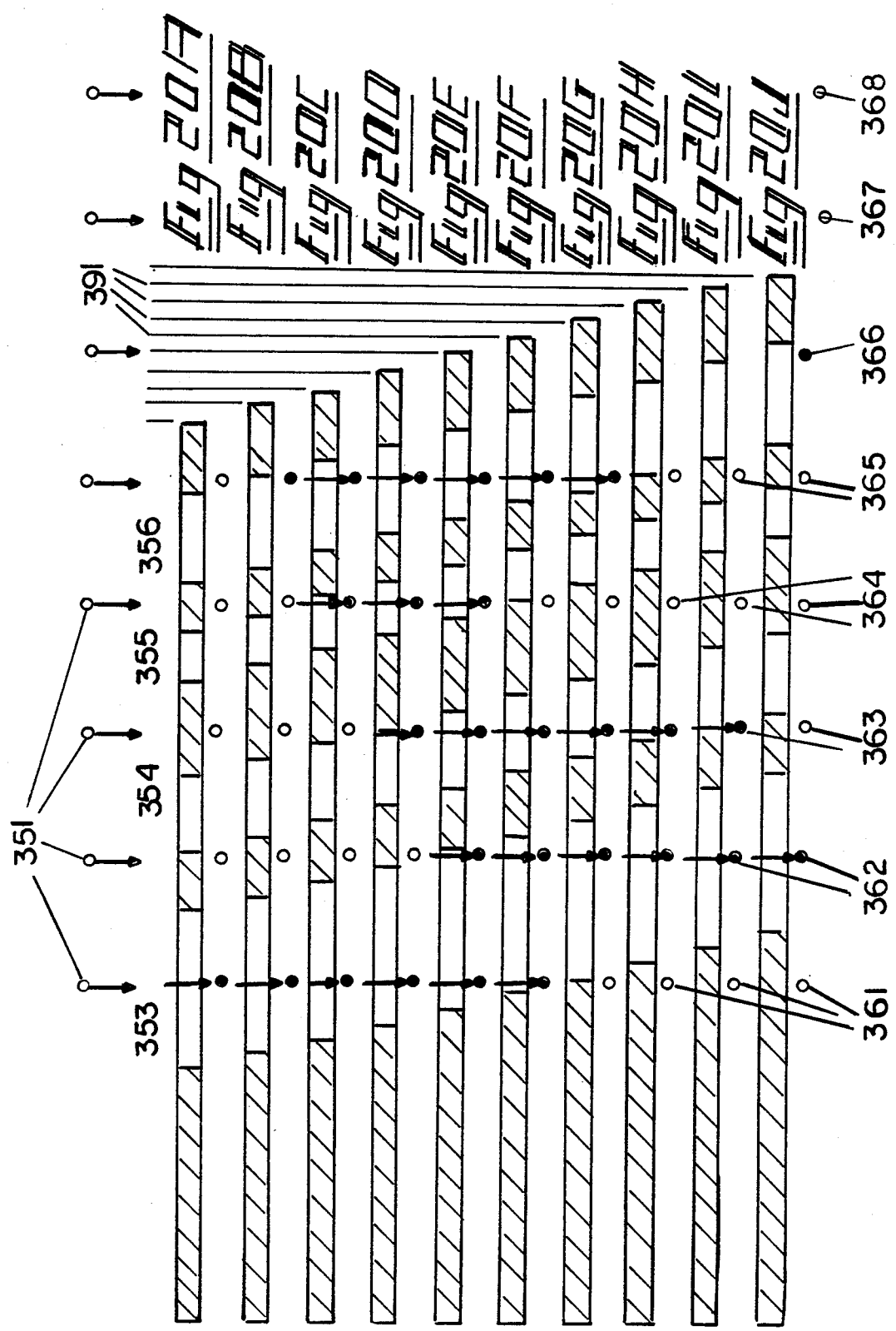

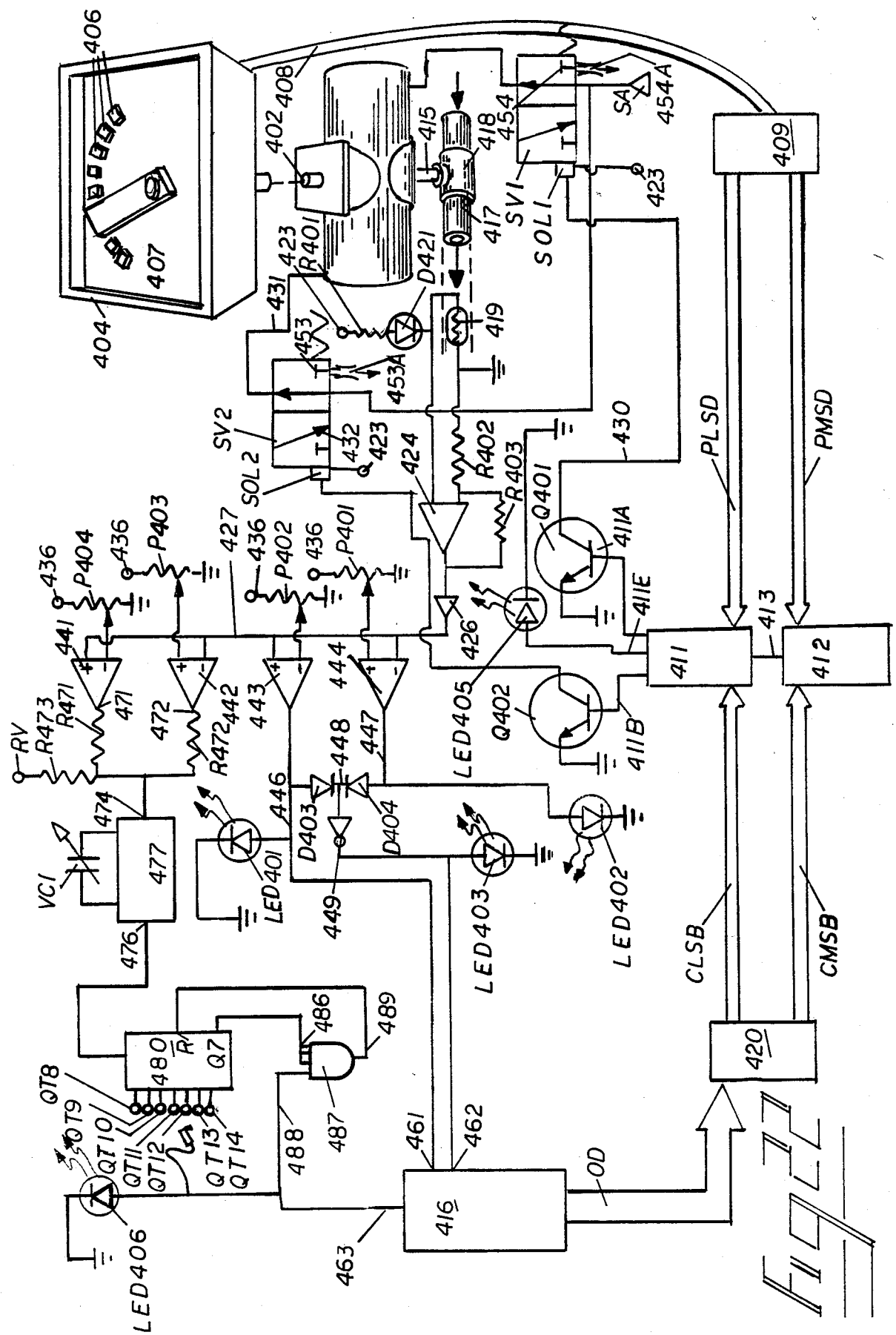

SHAFT POSITION DETECTOR AND CONTROL DEVICE

BACKGROUND OF THE INVENTION

This application is a Continuation-in-part of Ser. No. 368,138 filed Aug. 24, 1989, which is a continuation-in-part of Ser. No. 258,165 filed Oct. 14, 1988 which is a continuation of application Ser. No. 078,639 Filed July 28, 1987 which is a continuation of application Ser. No. 917,419, Filed Oct. 10, 1986, which is a continuation of application Ser. No. 653,288 Filed Sept. 24, 1984 entitled Digital Control Device.

The present invention relates to control devices, for example to control operation of an actuator to position a valve or other movable element utilized to control a process, for example a valve to control flow of a fluid to maintain pressure, temperature or flow rate. Other applications within the scope of the present invention include control of longitudinal movement, for example in positioning a linearly moving valve stem.

In some prior art procedures, and particularly with respect to chemical processes responsive to flow of a fluid regulated by operation of a valve, a control system includes a closed loop system with feedback signal from the process which reflects a selected process condition which it is desired to control. The feedback signal is then compared with a reference signal which is reflective of the desired process condition and an error signal is generated in response to the existence and for magnitude of the difference between the reference signal and the feedback signal. The error signal is then supplied to a controller which operates an actuator which moves the valve, or control element, in a corrective direction. The prior art generally have includes on-off, proportional, proportional plus integral, proportional plus derivative, and proportional plus integral plus derivative controllers.

The simplest type of controller is the on-off controller.

On-off controllers operate actuators to move control elements only between on and off positions and provide a differential gap which is the smallest range of values the variable must pass through to cause the correcting device to go from one position to the other, for example, on to off and vice versa. In such arrangements, the control is all or nothing, but such devices are generally the least expensive of all control arrangements.

In proportional control devices the correcting device is not forced to take an all or nothing position. Instead, it has a continuous range of possible positions and the position that it takes is proportional to the error signal which is generated as a function of the deviation of the process variable from the desired value or set point.

The proportional control mode ideally reduces oscillation which typically accompanies on-off control. However, proportional controllers inherently, if uncompensated, provide an "offset" from the set point each time a correction is made so that additional means must be provided to return the variable to the set point independent of the proportional plus integral control. In such instances proportional plus reset can be provided where the position of the control means is determined by the magnitude of an error signal as well as a time integral of the error signal.

Proportional plus integral control is adequate for some control situations, however, there are some processes which present very difficult problems which cannot be handled proportional plus integral control. These include situations where there are very rapid changes in the process variable accompanied by substantial time lags between applying the corrective action and the appearance of results of the corrective action in the measurement. In such arrangement proportional plus integral plus derivative control is provided where the extent of the corrective action to be taken is determined by the magnitude of the error signal multiplied by the time it has persisted and the time rate of change of the error signal so that a rapidly changing error cause a greater corrective action than a slowing changing error.

From the foregoing it is obvious that when a process is beyond the complexity which can be handled effectively by on-off controller the prior art has only provided expensive and extremely complicated control mechanism which do not fully provide the effect desired and which are also difficult to maintain and require well trained personnel to operate.

In general, most control procedures are analog in nature as are the signals utilized to finally position the control device.

U.S. Pat. No. 4,417,312 teaches a controller responsive to two signals one from a process sensor; the first representing the magnitude of a process parameter and the second signal representative of the desired magnitude of the process parameter. The sense of the difference is used to control direction of movement and the magnitude is used to control the rate of movement. Contrary to devices in accordance with the present invention the signals are all analog and the reference does not teach or even remotely suggest generation of a position input signal corresponding to a selected desired position in digital format, generating a digital signal indicative of the actual position of the control element comparing the two and then moving a actuator until the actual control element position corresponds with the selected position. Further, the reference does not teach a digital closed loop system of the type provided by the present invention.

Most prior art control devices are analog type where continuous movement and readjustment occurs, in most cases without feedback signal to the controller.

No prior art devices is known which moves the element, for example a valve stem, sequentially through steps at a selected rate to provide corrective action and allow time delay for the correction of the error so that the analog input error signal results in step wise corrective action or where analog signals ar converted to digital signals for operation of a final control device using a digital feed back signal from the final control device, for example a value actuator to confirm actuator position.

One prior art device offered for sale in the United States by El-O-Matic Inc. of Hoboken, New Jersey utilizes analog position signals to the positioning device and a potentiometer generated analog feedback signal where the position and feedback signals are compared and solenoid valves actuated to position the device. The reference does not suggest the unexpected advantages found by the present invention to result from positioning based in digital/digital signals as opposed to the analog/analog format taught by the reference.

SUMMARY OF THE INVENTION

Previous arrangements to accomplish control by means of a controller and control device to modulate a process control variable including the aforenoted arrangements, namely, offset, proportional, proportional plus reset, differential and integral are expensive and have inherent disadvantages previously discussed.

The pure analog procedures have the further disadvantage in that they tend toward instability.

The present invention provides inexpensive devices and control methods requiring little maintenance, yet positioners provided by the invention are smooth operating and diminish overshoot by use of digital positioning signals. In some instances with selected time delay, correction can be provided. In general, the present invention provides arrangements where the position of the control element, for example a valve is continuously fed back to a controller which then steps the control element in corrective direction in digitally generated steps, for example in response to a change in a digital signal indicative of a desired position of the control element where the desired position is generated an error signal indicative of the process condition. It has unexpectedly been found that stable control and positioning is achieved by the use of digital/digital systems of the present invention in part because the positioning in digital increments allows time for solenoid valve switching in the case of positioning fluid powered actuators and also allows an increment of time for pressure adjustment on each side of the actuator element in the case of pneumatic actuators.

A digital comparator is provided to receive a first binary digital signal, for example from a programmable process controller or an analog process controller which provides an analog command signal which is supplied to an analog to digital converter which is adapted to provide the desired position of the control element in digital format, and to receive a second binary digital signal in the same format from a position indicator associated with the shaft, compare the two and actuate drive means to move the control element to the position indicated.

Moreover, devices within the scope of the present invention are useful in both electronic and fluid operated devices such as pneumatic or hydraulic operating systems, to operate valves and or other devices.

Examples of suitable digital position transmitters are discussed herinafter and in my copending application Ser. No. 911,162 Filing Date, Sept. 24, 1986.

More particularly, the present invention provides a control operator means to operate a control device to modify a process condition toward a desired status including first sensor means to sense the process condition and transmit a process signal reflective of the process condition, set point means to provide a set point signal reflective of a process signal at the desired process condition, comparator and provide error signals where a first error signal is provided when the process signal is greater than the set point signal and a second error signal is provided when the process signal is less than the set point signal. Counter means are provided to provide a digital output signal of selected format where the counter means counts the output signal up or down in response the first and second error signals and supplies the output signal to a first signal input of a digital comparator which has a second digital input and provides comparator output signal when the signal at the first and second inputs to the digital comparator do not match.

A position indicator is provided for a control element which moves bidirectionally to change the process condition and provides a digital signal indicative of the position of the element to the second input of the digital comparator. Drive means are provided to move the element in a first corrective direction in one direction in response to differences in the comparator output signal and the first error signal in a first direction and in a second corrective direction in response to differences in the comparator output signal and the second error signal. Timing means can be provided to control the up/down rate of count of the counter output.

A digital positioning arrangement is provided to operate an actuator operable bidirectionally between first and second limits to position control means to position a shaft at selected locations between first and second limits where said shaft can be moved, bidirectionally between said limits by actuator means including position indicator means to provide a first set of binary digital output signals in response to selected positions of said shaft means between the first and second limits set point signal generator means to selectively generate a second set of binary digital signals in the same and format as said first set of binary digital output signals to correspond to selected position of said shaft means between said first and second limits digital comparator means to receive said first and second sets of digital signals to compare said first and second sets of binary digital signals and having output means to provide a first direction signal when said first and second sets of binary digital signals do not match and said first set of binary digital signals is greater than said second set of binary digital signals and provide a second direction signal when said first and second sets of binary digital signals do not match and said first set of binary signals is less than said second set of binary digital signals with motive means to operate said actuator means and motive means control means to receive said first and second directional signals and operate said actuator means to move said shaft toward one of said first and second limits in response to said first signal, to move said shaft toward the other of said first and second limits in response to said second signal and to terminate movement of said shaft when said first and second binary signals are equal. Examples in accordance with the present invention are described with reference to the accompanying Figures but it will be understood that the descriptions given herein are by way of illustration only and that other arrangements and applications will occur to those skilled in the art upon reading the disclosure set forth hereinafter.

BRIEF DESCRIPTION OF THE DRAWINGS

With reference to the accompanying Figures which illustrate one arrangement within the scope of the present invention:

FIG. 1 is a schematic illustration of an arrangement in accordance with the present invention;

FIG. 2 is a graphic illustration of the operation of the device shown in FIG. 1;

FIG. 3 is a schematic illustration of an example of a digital comparator useful in the arrangement shown in FIG. 1;

FIG. 4A–4C are schematic illustrations of a position indicator useful in the arrangement shown in FIG. 1;

FIG. 5 is a truth table illustrating the operating characteristics of the position indicator shown in FIG. 4;

FIG. 7 is a schematic diagram of another arrangement within the scope of the present invention to position a shaft to a selected positions between limits of movement of the shaft.

FIG. 8A-8H illustrate yet another sensor/actuator relationship within the scope of the present invention;

FIG. 9 illustrates a magnetic actuation arrangement useful in arrangements of the type shown in FIGS. 8A-8H;

FIG. 10 shows a truth table for the position shown in FIGS. 8A-8H;

FIGS. 11A-11N illustrate another sensor/actuator relationship within the scope of the present invention;

FIG. 12 illustrates a magnetic actuation arrangement useful in arrangements of the type shown in FIG. 11-11N;

FIG. 13 shows a truth table for the positions shown in FIGS. 11A-11N;

FIG. 14 illustrates another sensor/actuator relationship within the scope of the present invention;

FIG. 15 illustrates another sensor/actuator relationship within the scope of the present invention;

FIG. 16 illustrates another sensor/actuator relationship within the scope of the present invention;

FIG. 17 illustrates another sensor/actuator relationship within the scope of the present invention;

FIG. 19A-19C illustrate slotted shutter devices useful in position transmitters of the type shown in FIG. 19;

FIGS. 20A-20J illustrate sequential positioning of the slotted shutter of FIG. 19;

FIG. 22 is a schematic diagram of an example of another control arrangement within the scope of the present invention.

DETAILED DESCRIPTION OF THE DRAWINGS

Figure 6:
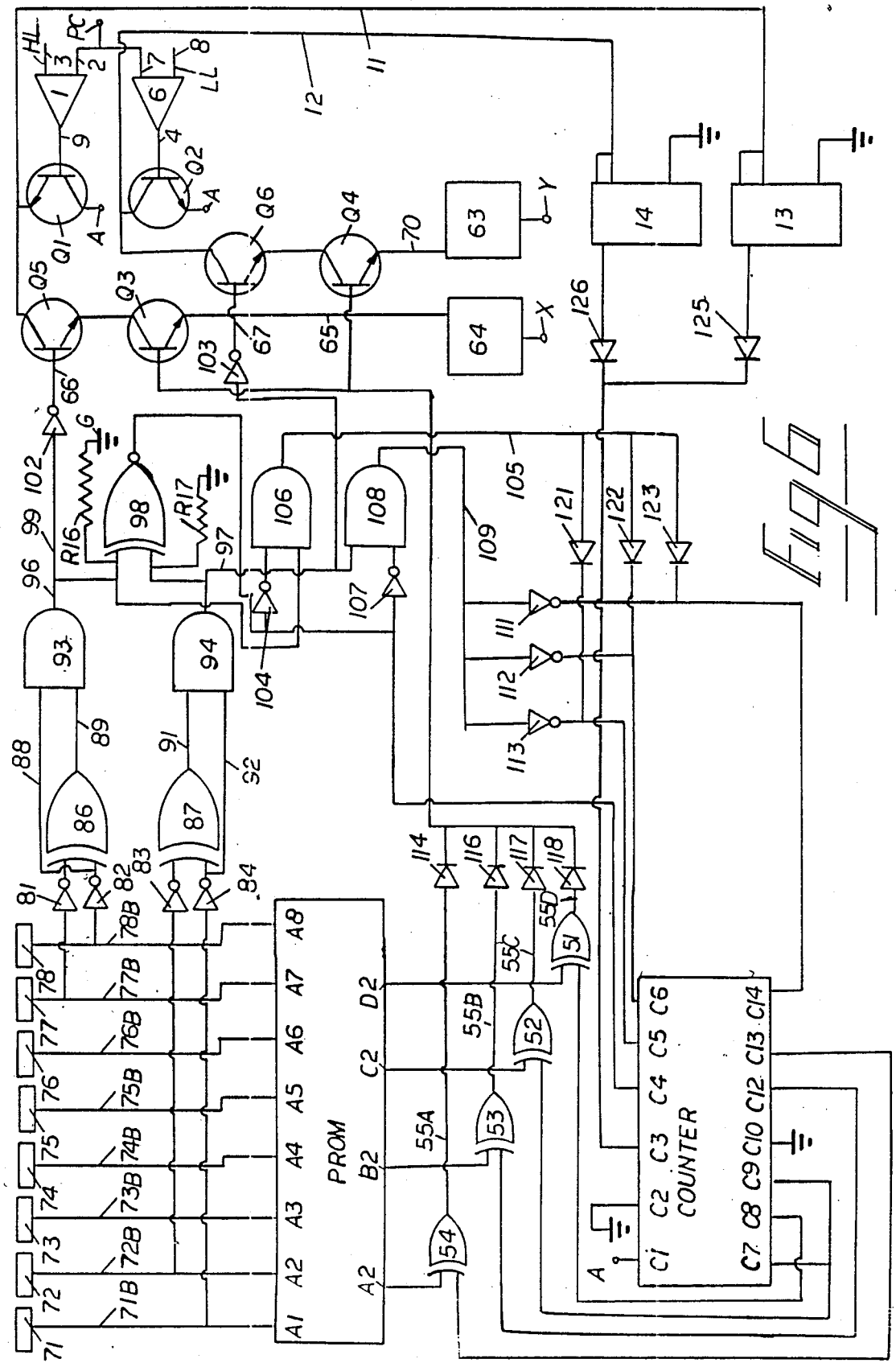
FIG. 6 is a more detailed schematic illustration of the arrangement shown in FIG. 1.

As described in more detail hereinafter one example of a device within the scope of the present invention provide controller means to sequentially step an operator element, for example a valve, bidirectionally through segments of a path of travel in response to digital position signals in a corrective direction to reduce an error signal generated by deviation of a process condition from a selected value.

In another arrangement within the scope of the present invention a controller is provided to move the element to a position selected arbitrarily or in response to a selected condition.

FIG. 1 illustrates schematically one device within the scope of present invention which includes a condition sensor 5 to sense a selected condition, for example a characteristic of a fluid in a pipe 31 such as pressure or temperature where flow through the pipe is controlled by means of a valve 32 which, for example, operates to increase or reduce pressure or to control temperature at a location downstream of the valve in pipe 31. In the example shown valve 32 can be a rotary ¼ turn valve where the valve stem turns through a 90° arc between full open and full closed to modulate flow therebetween, but other arrangements such as linear valves or other control elements can also be used.

A position sensor 33 is provided to provide a binary multibit signal to indicate the position of the valve as a natural binary signal. On example of a satisfactory device is described generally hereinafter and a more detailed description is provided in my copending application Ser. No. 419,045 filed Sept. 16, 1982. In general, position sensor 33 can be any suitable type of absolute position encoder. While the example refers to a unit using a magnet carried by the valve shaft to actuate spaced magnetic sensors other arrangements such as optical encoders which provide a digital output signal can be used as well within the scope of the present invention.

In the example described, position sensor 33 is located on the shaft 30 of valve 33 and includes, for example, a magnet 70 (FIGS. 4A-4C) which rotates with the valve shaft to actuate sensors 71-78 for example Hall Effect sensors which are actuated to electrically conductive condition by the presence of a magnetic field to provide a characteristic digital indication of the position of the shaft in an arc of rotation in selected segments of the arc of rotation as described hereinafter. In the arrangement shown where 8 sensors are provided and the effective length of the magnetic field provided by the magnet 70 is about 1½ times the spacing between the center of the sensors fifteen positions would be indicated. The position of the shaft, and valve, is adjusted by means of a motive means such as a motor 36 to control the rate of fluid flow through the valve in response to an error signal. Motor 36 has, as is known in the art, a ground connection G as well as 2 coils having X and Y connection so that upon energization of one coil the motor turns in one direction and upon energization of other coil the motor turns in the other direction to turn the shaft and adjust the position of the valve in accordance with the error signal. While an electric motor is utilized in the example of FIG. 1 it will be understood that other devices such as pneumatic actuators can be utilized where the fluid supply to the actuator would be controlled by the controller.

A signal can be supplied from sensor 5 to signal conditioner 20, which is optional, but can be provided to modify the signal to provide a process condition signal PC reflective of the process condition. Signal PC is supplied to the inverting and noninverting inputs of each of two comparators 1 and 6, for example National Semiconductor part No. 741. The other inputs to the comparators are connected one to the HL input 3 supplied from a reference A through an adjusting resistor R1 and adjusted thereby, and the input 8 of comparator 6 is supplied from reference A through a second adjusting resistor R2 and is noted as input LL. The difference between HL and LL provides the control range or proportional band as shown in FIG. 2 between HL and LL where the adjustment provided by resistance R1 and R2 sets the control range. It will be understood that in some arrangements within the scope of the present invention the reference A can be reflective of the desired process condition or set point while in other arrangements the reference can be arbitrary and need not be the same for both comparators. Output 9 from comparator 1 is supplied to the base of a transistor Q1 and output 4 from comparator 6 is supplied to the base of transistor Q2. The collectors of the transistors Q1 and Q2 are connected to power source A and the emitters 11 and 12 are connected to actuate timers 13 and 14. Timers 13 and 14, upon actuation by transistors Q1 and Q2 as previously described, supply regular pulses 18 and 19 of selected frequency at outputs 16 and 17 respectively to the clock of an up/down counter 30. The output pulses are provided at frequencies selected in accordance with several factors including the time response of the process system and other characteristic of the system and can be different for error signals below the lower reference LL and above the upper reference HL where the timing can be adjusted by variable potentiometers VR1 and VR2 from a reference voltage C. The pulse rate can be further adjusted by signals 44 and 49 form operational amplifiers 43, 46 connected as difference amplifiers where the process signal PC is supplied to each difference amplifier the reference signal HL supplied to the other terminal of amplifier 43, the reference signal LL supplied to the other input of amplifier 46 so that the timing adjusting inputs of timers 13 and 14 can adjust the pulse rate of outputs 16 and 17 in accordance with the magnitude of the direction of the process signal PC from the reference signals HL and LL.

With reference to Comparator 6, output 4 is supplied to the base of transistor 2 with its collector connected to a power source A and emitter 12 connected to input 10 to a timer 14, which supplies a pulse signal 19 at output 17 to the clock input CLK of binary up/down counter 30. A similar arrangement is provided to supply output 16 of operates in response to actuation of both transistors Q1 and Q2. The frequency of pulse 18 and 19 can be the same or can be different depending upon the rate at which it is desired to correct the process condition as described hereinbefore.

Output 11 of transistor Q1 is also connected through an inverting buffer 132 to the up/down input of binary up/down counter 30, for example a part No. 7465191. Output 12 of transistor Q2 is also connected to the input so the counter counts up or down in response to which of the transistors Q1 or Q2 is actuated at a rate depending on the pulse rate of the timer is engaged and whether the counter is in the "up count" or "down count" mode as discussed hereinafter.

Output A1-B1-C1-D1 of counter 30 in this case supply a 4 bit binary word to a binary comparator 40 an example of which is shown in FIG. 3.

With reference to sensor unit 33 the sensor unit provides a natural binary digital numerical output 34 of selected number of bits, depending on the number of positions sensed, to a signal conditioner 56 which, for example including a programmable read only memory which supplies a natural binary digital output A2-B2-C2-D2 in the form of, in this case, a 4 bit natural binary word to a second set of inputs to binary comparator 40 in accordance with the position of the valve shaft determined by sensor 33. The sensor unit 33 is described hereinafter but for the present it is to be understood that the sensor determines the position of the valve member in valve 32 in terms of segments of the total arc of rotation and provides a binary word indicative of the position. For example, the segment may be 5% of the arc of rotation or 10% of the arc of rotation or any other selected segment. The output from conditioner 56 is a natural binary word indication of the particular segment of the arc of rotation in which the valve is presently located in the same number of bits as supplied from counter 30.

While various devices may be used as a digital comparator such as National Semiconductor part No. 74585 one straight forward example of a binary comparator 40 is illustrated in FIG. 3 where exclusive OR gates 51-54 are illustrated, each having an output connected in common at output 55 and each adapted to receive a pair of the signals A (1-2), B (1-2), C (1-2), and D (1-2) one each from the counter and signal conditioner. In the event of a mismatch, output 55 goes Hi and the digital comparator output signal is supplied to the base of transistors Q3 and Q4 which are in a circuit described hereinafter to actuate one of the coils X or Y of motor 36 to move the valve in a process correcting direction.

In operation magnet 70 (FIGS. 4A-4C) is carried by shaft 30 of motor 36 and/or the shaft which turns the valve member of valve 32 which moves back and forth (for example in a 90° arc) to move the valve member (not shown) of valve 32 to regulate flow of fluid through the valve in response to change in condition sensed by the sensor 5 which supplies a signal to signal processor 20 to supply signal PC reflective of the condition sensed.

The position of the valve is measured by sensor 33 which is the present illustration includes sensors 71-78 in spaced planar relation through the quarter arc of travel of the valve shaft or motor shaft extending through the sensor body. A magnet of similar configuration to magnet 70 is carried to alternately actuated first one then two of the sensors 71-78 to indicate the segment (in this case 0 to 14) of the arc of rotation in which the shaft is located all as described in more detail hereinafter.

As previously discussed the signal PC, referring to FIGS. 1 and 6, is supplied to the inputs 2 and 7 of comparators 1 and 6 where input 3 to comparator 1 receives a high limit signal HL determined as shown in FIG. 1 to provide a high permissible limit of the process signal PC as shown in FIG. 2. Input 8 of comparator 6 is adapted to receive a lower limit signal LL which represents the lowest permissible limit of signal PC. Thus when the process signal PC exceeds limit HL shown as point G in FIG. 2 output 9 of comparator 1 is "on" as shown by signal 9A of FIG. 2. When signal PC falls below the lower limit LL shown as point I of FIG. 2 output 4 of comparator 6 turns on as shown by signal 4A of FIG. 2.

As previously described when the process signal PC exceeds limit HL output 9 turns on transistor Q1 having its collector connected to a voltage source A and emitter connected to drive timer 13, for example a part No. 7465191 so that for each clock output pulse the clock in this case could decrease the binary number (A1, B1, C1, D1) of counter 30 at the output of counter 30. The counter goes up or down depending on whether the signal at input U/D is "Hi" or "Lo". In the case of the process signal PC exceeding the high limit HL it is assumed that it is desirable to move the valve toward a closed position so the output 11 from transistor Q1 is connected to an inverting buffer 132 which supplies a "Lo" input to pin U/D of counter 30 when transistor Q1 is on and the process condition PC exceeds HL the high limit. The binary digital output A1, B1, C1, D1 from counter 30 then decreases for each pulse 18 at output 16 of timer 13. When the process condition PC falls into the range between the high limit HL and the low limit LL comparator 1 turns off transistor Q1 so no further pulses are received and the output from counter 30 stabilizes.

In the meantime, assuming that the A2, B2, C2, D2 output from conditioner 56 was initially equal to A1, B1, C1, D1 as determined by OR gates 51-54 of binary comparator 4 so that outputs 51A–51D were "Lo" the step down in output A1–D1 previously described would cause a mismatch in the A1–D1 and A2–D2 input to comparator 40 so output 55 would go "Hi" to turn on transistors Q3 and Q4 in the enable lines 21 and 22 to relays 63 and 64. However since only transistor Q1 is actuated since the signal PC exceeds the high limit HL and transistor Q2 is not actuated power would be supplied only through transistor Q3.

It will be understood that in the event the process signal PC were to fall below the limit LL transistor Q2 would go conductive so a "Hi" would be applied to the U/D input of counter 30 and the output would count up causing a mismatch in comparator 30 and actuating output 55 to turn on transistors Q3 and Q4 but this time transistor Q4 would conduct. Thus output 55 is actuated for any mismatch but the direction of the corrective action is determined by which of the transistor Q1 and Q2 is actuated to actuate one or the other of the relays 63, 64. Operation of transistor Q5 and Q6 will be discussed later herein but for the time being they will be considered normally conductive. In response to the signal PC exceeding HL only relay 63 would be actuated since transistor Q2 would be nonconductive and transistor Q1 would be actuated in correction in the proper direction would result. The relays 63 and 64 (which would be actuated when the signal PC falls between the lower limit LL and transistor Q2 is actuated to rotate motor 36 in the opposite direction) can be of standard configuration. In the example shown relays 63 and 64 are Opto isolated relays, for example part No. MOC3011 from Elec-trol Inc. Relays 63 and 64 each have a triac output X and Y respectively provided by back to back SCR's 62 where optocoupling is utilized by means of a LED 61 turned on by the output of transistor Q1 in the case of relay 63 and transistor Q2 in the case of relay 64 to fire the SCR's. Power supply D which can be alternating current is supplied to the relays and then by means of outputs X and Y to the appropriate coil of motor 36 depending on which limit if any has been exceeded. Thus only one of the relays will be actuated at a time and where the signal PC is between limits HL and LL both relays are off.

While the foregoing description relates to the use of the device with a drive means such as a motor it will be understood other means such as pneumatic or hydraulic devices can be utilized where valves are utilized to supply motive fluid to turn the valve or move the appropriate element in the desired direction. Also while in the arrangement shown both transistors Q3 and Q4 are activated by a mismatch in the digital comparator equally satisfactory alternate arrangements can be provided where only the appropriate transistor is actuated.

Likewise it will be noted that while various position transmitter devices are illustrated and are particularly useful for generation of position signals in digital mode other position transmitter means can also be used to generate digital position signals.

It will also be noted that transistors Q5 and Q6 are provided in the enable lines 65 and 70 to relays 63 and 64. These transistors are conductive except when the shaft is at one limit or the other. For example, transistor Q5 goes nonconductive when the magnet 70 is over only sensor 78 as for example when the valve is full open and transistor Q6 being nonconductive when the magnet 70 is only over sensor 71 for example when the value is full closed all as described hereinafter to prevent shaft movement beyond the limits.

FIG. 4A–4C illustrate one example in schematic of an arrangement to provide indication of valve shaft position as can be provided by position indicator 33 of FIG. 1.

In FIG. 4A–4C a magnet 70 is shown where the magnet would be located in sensor 33 and carried by the shaft of valve 32 or motor 36, which can be a bidirectionally rotated motor previously described.

In the example Hall effect sensors 71–78 are located in spaced planar relation in an arc parallel to the path of travel of magnet 70 with the shaft, for example in a 90° arc, all as illustrated and described in my copending application Ser. No. 419,045 filed Sept. 16, 1982.

In FIG. 4A–4C the magnets 71–78 are shown in a linear path to be sequentially located in the field of magnet 70. The orientation of the magnets as shown in FIGS. 4A–4C illustrates an arrangement suitable for a linear moving element which would carry magnet 70 and to facilitate explanation of the operation of sensor 33. It will, however, be understood that in the use of the principals discussed herein a rotary valve the magnet would be located at a 90° arc about the valve shaft and the magnet would move in an arc with movement of the shaft. As is known in the art, when the field of appropriate polarity of magnet 70 is located in proximity to the sensing areas 71A–78A of sensors 71–78 the electrical characteristic of the detector changes, as a result of the will known Hall effect in this case the detector goes conductive and the change is reflected at the output 71B–78B of the actuated sensors.

In the arrangement shown, positive pullup voltage A is supplied through resistors R12 to output 71B–78B of sensors 71–78 so the outputs are maintained "Hi" when the sensors 71–78 are nonconductive. Thus only the sensors which have sensing areas 71A–78A exposed to the field of magnet 70 will be conductive and those sensors will have "Lo" outputs since the output is conductive to ground through the detector.

In accordance with the example shown magnet 70 has a length K which is greater than the width of the sensing areas of sensors 71–78 and greater than the spacing L between the sensing areas of adjacent sensors so that at least one sensor is always actuated and two of the sensors are alternately actuated as described hereinafter.

For example, FIG. 4A illustrates the case where magnet 70 is located only over the sensing area 71A of sensor 71 so sensor 71 is conductive and output 71B is Lo as indicated by indicator 71C. Indicators 72C–78C indicate outputs 72B–78B are Hi.

In FIG. 4B magnet 70 has moved to a position over the sensing areas 71A, 72A of sensors 71, 72 so the outputs 71B, 72B are low as indicated by the indicators 71C, 72C which are Lo while the balance of the outputs 73–78 are Hi.

FIG. 4C illustrates the case where magnet 70 has moved over the sensing area of sensor 72 so only output 72B is low.

The effects of the movement of magnet 70 through the entire length of travel is shown in FIG. 5 where the presence of a Lo at the output from sensor 71–78 is shown as "0" and the outputs 71B–78B which are Hi are reflected by "1". It will be seen that for each of the fifteen position (0–14) which can be determined by the arrangement shown a different 8 bit binary word is obtained.

As previously discussed, the outputs 71B–78B from sensors 33 of FIG. 1 are provided by means of a multi-conductor lead 34 to a signal conditioner 56. While the signals could be utilized in the form provided by outputs 71B–78B in the example shown the signals are modified to match the natural binary signals provided by counter 30. In this regard the signals 71B–78B can be provided to an Erasable Programmable Read Only Memory (EPROM) 56 for example part No. MM/2716 (National Semiconductor) shown schematically in FIG. 6 which provides a four bit natural binary word at the outputs A2–D2 of memory 56 where examples of the outputs are shown in FIG. 5 as "PROM OUTPUTS".

In summary, the position of the valve is supplied to the Programmable Read Only Memory 56 which supplies numbers 0–14 as 4 bit natural binary words to comparator 40 to be matched with the output from counter 30. In the event of a mismatch, output 55 of comparator 40 goes high to enable both transistors Q3 and Q4 in lines 21 and 22 and the line to relays 63 and 64. The relay which is actually energized depends upon which of the transistors Q1, Q2 is energized in response to process signal PC falling above or below HL or LL as previously described so that the motor 36 operates valve 32 in a correcting direction.

In some instances it is desirable to acknowledge the presence of the shaft at the limits of rotation of the shaft to prevent overmovement. FIG. 6 presents a more detailed schematic of the arrangement shown in FIG. 1 and also illustrates one means of accomplishing the objective where it is necessary to acknowledge the presence of magnet 70 over sensors 71 or 78 but not when the magnet is in the sensing area of sensor pairs 71, 72, and 77, 78 where the shaft is not a limit.

With reference to the limit at sensor 78, outputs 77B, 78B are supplied to inverters 81 82 then to the inputs of an "exclusive OR" gate 86. The output 89 from "AND" gate 93 is supplied to one input of an "AND" gate 93 along with the output 88 from the inverter 82. Thus by the logic of the system output 96 of AND gate 93 goes high when the field of magnet 70 is in the sensing area of sensor 78 but not when the field is in the sensing area of sensors 77 and 78 where "OR" gate 86 would be "OFF" keeping "AND" gate 93 of "OFF". An inverting buffer 102 is provided in the output 99 of "AND" gate 93 to supply an output 66 to the base of transistor Q5 as also shown in FIG. 1 so that when the magnet 70 is over only sensor 78 output 66 goes "LO" to turn off transistor Q5 and prevent further movement of the shaft of motor 36 to prevent overshoot or energization of the coil X of motor 36 when the shaft should not turn.

In a similar arrangement buffer inverters 83, 84 are provided in outputs 71B and 72B to "OR" gate 87 and "AND" gate 94 to provide A output 97 to inverter 103 and transistor Q6 in the enable line to relay 63 to disable the power supply to relay 63 when shaft is at the opposite limit.

Also within the scope of the present invention means illustrated in FIG. 6 can be provided to reset counter 30 at the limits of movement of the shaft of the valve. With respect to the high limit as previously described, output 96 of "AND" gate 93 and the output 97 from "AND" gate 94 are supplied to the input of an exclusive "OR" gate 98. Outputs 96 and 97 are both "LO" when the magnet is not at either limit so output 101 is normally "LO". When either of the inputs goes HI indicative of the fact that the magnet is at one, or the other, limit output 101 goes "HI" to input C4, the reset input to counter 30 to allow data entry to the counter.

Typically the output 101 or "OR" gate 98 goes "HI" when the field of magnet 70 is at either of the limits to actuate the reset input of counter 30 and input the data at inputs C2, C5, C6 and C14 for the appropriate limit. The data input is for the actuated limit, that is in the arrangement shown 0000 for the lower limit and 0111 for the upper limit.

At the lower limit where the input is to be 0000 input C4 goes "HI" as previously described and the input C5, C6 and C14 are provided in the "LO" and "0" state from "AND" gate 108 which has one input connected to output 97 of "AND" gate 94 which goes "HI" at one limit and the other input to output 101 of exclusive "OR" gate 101 as previously described so the reset input is actuated and 0000 is supplied to inputs C5, C6 and C14. At the other limit AND gate "106" is actuated by output 96 and output 101 is supplied through inverter 104 so the signal 0111 is supplied to inputs C5, C6, C14 through buffers 121–123.

In this manner if for some reason there is a mismatch between the signals A1, B1, C1, D1 supplied to comparator 50 and outputs A2, B2, C2, D2 supplied from counter 30 the mismatch is corrected when the magnet is moved to one of the limits.

In the arrangement shown enable input C11 is connected to voltage source A so counter 30 is continuously enabled.

As shown, timers 13 and 14 are turned on and off by actuation by transistors Q1 and Q2 depending upon the out of range direction. That is whether the process condition is too high or too low with reference to the set point, as previously described the actuated timer 13 or 14 supplies pulses at selected rates to clock input C3 of counter 30 s that the counter counts up, or down depending on what transistors is actuated to move the shaft and magnet to the position selected by the moving count from counter 30. The rate of pulses from the timersideally bears some relation to the time constant of the systems being controlled. That is the time lapse between making a control connection and the appearance of the effect of the change as reflected in the process signal.

Furthermore in some cases it is desirable to vary the rate of the pulses provided by the timers 13 and 14 in response to the magnitude of the error signal—that is the difference between the process signal PC and the limit LL or HL as the case may be, so that the rate of correction depends on the magnitude of the difference and the rate deminishes as the difference decreases.

Also, as shown in FIG. 1 the pulse rate of timers 13 and 14 can be adjusted by means of outputs 44 and 49 from operational amplifiers connected as differential amplifiers 43 and 46. The inputs 42 and 47 to amplifiers 43 and 46 are from the signal conditioner 20 and the other inputs 41 and 38 are, respectively, the high limit HL and low limit LL so that the outputs 44 and 49 from each of the amplifiers is reflective of the span between the reference limits HL, LL and the error signal so that the pulse rate of the timers 13 and 14 is reflective of the difference between the reference and the error signal. A base pulse rate can be provided by the source C supplied through potentiometers VR1 and VR2 to timers 13 and 14.

FIG. 7 illustrates another arrangement within the scope of the present invention where means are provided to move the shaft, in this case the shaft of valve 32 to a position selected by the controller, for example programmable controller 146 which supplies a desired output position in digital format and monitored by the position indicator 33 as previously described.

In the arrangement shown in FIG. 7, positioner 33 includes sensors 171–178 connected through pullup resistors R112–R119 to positive voltage source A, which are shown in exploded form as also shown previously in FIGS. 4A–4D and 6. Magnet 170 is carried by shaft 30. The outputs 171B–178B are supplied to addresses 156-1A to 156-7A of an EPROM 156 as previously described which supplies natural binary number 156A2–156D2 indicative of the position of the valve in the arc of travel. Signals A2–D2 are supplied to a set of inputs of a binary comparator 141, for example National Semiconductor part No. 74C85 which compares input binary signals 156A2–156D2 and 147 and supplies an output signal dependent upon which input binary signal is numerically greater.

It will be understood that within the scope of the present invention a device such as part No. 74C85 could also have been utilized in the arrangement shown in FIGS. 1 and 6 to process signals.

In the arrangement shown in FIG. 7 the second set of binary signals 147, which is compared to the signals 156A2–156D2 reflective of the position of the valve, are supplied to comparator 141 from a selected source. In the arrangement shown the source is a programmable controller 146, of any type commonly utilized to control processes in manufacturing facilities and in this case is used to supply signals indicative of the valve position desired. It will be understood that while one example of the present invention is illustrated and described with reference to a programmable digital controller, within the scope of the present invention any input signal source can be utilized to provide a digital signal indicative of the desired position of the element between limits and, for example comprehends a system where a process controller generates an analog signal indicative of the desired position where the analog signal is converted to digital for comparison with the digital signal from the position transmitter. It should be noted that in accordance with one feature of the present invention it has been found that by the use of digital signals for comparison of the desired position used the actual position and operation of an actuator to move a shaft between limits in accordance therewith improved stability and operability is provided. In the arrangement shown an output cable 147 containing the conductors to supply the digital signals from the process controller 146 to the comparator 141. Process controller 146 receives an input signal 148 from signal conditioner 20, which receives a signal from the process sensor 5 as previously described, and converts the signal to a useful form. Alternatively, an error signal could be generated by controller 20 as previously described, indicative of the difference between the process signal, determined by sensor 6, and a selected desired condition. Typically the signal 148, either the signal indicative of the process condition or an error signal, is supplied to the process controller 146. As is known in the art, the process controller will have been programmed to receive signal 148, determine what corrective action, if any, is called for. If corrective action is to be taken, the process controller will then supply the desired corrective position of the valve shaft at output 147 to comparator 141. If the valve is not already at the position, there is mismatch and one of the outputs 142, 143 is actuated depending on which of the signals 147 or 156A–156D is the larger. The outputs 142, 143 actuate switches, for example one of the transistors Q7, Q8, depending upon which output is actuated to supply power to the appropriate terminal X or Y of motor 36 (or in the case fluid operation outputs 144, 145 to fluid supply valve (not shown) to an actuator) to rotate the valve in the direction called for by process controller 146, until valve shaft 30 has rotated to a position where the signal 147 and 156A–156D match at which time the actuated output 144, 145 is turned off.

Additionally within the scope of the present invention the signals 152A2–152D2 can be supplied for example by means of a conductor 149 to process controller 146 to confirm that the valve has reached the position selected by the process controller. In some systems where the process controller has an on board real time clock, the process controller can be programmed to remember the required lapsed time for valve correction to appear and utilized the lapsed time data to determine the interval between corrective steps of the value in future instances.

In addition to the position transmitter arrangement shown in FIGS. 4A–4C and FIG. 7 other arrangements are available within the scope of the present invention.

FIGS. 8–8H, 9, and 10 illustrate yet another arrangement within the scope of the present invention for the multiple actuation of sensors in a sensor set by two, or more actuation devices, in this case two magnets, for example magnets 276A, 278A carried by an element 275 as shown in FIG. 10 where the sensor set is located in a single path parallel to the path of travel of the magnets and element as shown in FIGS. 8A–8H.

Referring to FIG. 8A, sensors 271–274 are illustrated and located in a travel path where each of the sensors, respectively, has a sensor actuation area 271A–274A. In the arrangement shown two actuation devices, for example, magnets, 276A and 276B as shown in FIG. 9 are located to provide actuation spans 276 and 278 as shown in selected relation as discussed hereinafter.

In accordance with one feature of the present invention it has been found that by proper sizing of the actuation spans of the magnets, and the spacing between the actuation spans of the magnets, a unique pattern of digital signals can be developed from one sensor set which is indicative of the position of the element which carries the magnets to allow greatly enhanced use of a fewer number of sensors.

The actuation areas of the sensors, as shown, are separated by a distance L10. In accordance with one feature of the present invention the actuation span 276 of magnet 276A has a length L11 which is greater than the distance L10 and typically is 1.25 (L11). The magnet 278A has an actuation span 278 of a length L12 which is less than the distance L10 and typically is equal to 0.75 (L11).

The actuation span of the magnets can be related to L10 so that in general the length L11 of the actuation span 276 of magnet 276A can be greater than L10 and can be equal to $[N_2(L10)+X]$ where "$N_2$" is a whole integer "X" and is a distance less than L10, for example, 0.25(L10). A spacing L13 can be provided between the spans 276,278 of the magnets 276A, 278A, where the spacing is selected to facilitate the generation of proper signals and it too can be a function of L10, or a number of increments of L10, where the distance L13 is, in general equal to $[N_3(L10)+D]$ where N is 0, or a whole integer and where "D" is less than "L", and for example in the arrangements shown in FIGS. 8A–8G N is 0 and D is 0.5L.

Likewise the length L12 of the span 278 can be equal to [N4(L10)+S] where N4 is "0" or a whole integer and "S" is a distance less than L10 for example 0.75(L10) and in FIGS. 8A–8G N4 is 0 and S is 0.75 (L10).

The arrangements shown generate a set of signals as described hereinafter and shown in FIG. 16 as positions 8A–8H which are generally equally spaced and of width determined by where the sensors 271–274 turn on and off as the magnet spans engage and disengage the sensor actuation areas 271A–274A.

FIGS. 8A–8H illustrate the successive positions of an element 275 as it progresses in a direction of movement as shown.

For example, in FIG. 8A the actuation span 276 engages the sensing area 271A of the sensor 271 and the actuation span 278 of magnet 278A engages the sensing area 272A of sensor 272.

In FIG. 8B the magnets 276A, 278A have moved together to the right so that the actuation span 276 of magnet 276A engages the sensing area 271A of sensor 271 but the actuation span 278 of magnet 278A does not engage a sensor.

In FIG. 8C the element has moved further in the same direction so that the actuation span 276A of magnet 276 is still in an engagement with the sensing area 271A of the sensor 271 and the magnet 278 has moved to the point where it engages the sensing area 273A of the sensor 273. At this point the sensor 272 is not engaged by the magnetic field of either magnet.

In FIG. 8D the magnet 276A has moved to the point where the span 276 engages the sensing area 271A, 272A of the sensors 271, 272 and the field 278 of magnet 278A engages the sensing area 273A of the sensor 273.

In FIG. 8E the field 276 of magnet 276A has progressed to the point where it has become disengaged from the sensing area 271A of the sensor 271, but still engages the sensing 272A of the sensor 272 and the field 278 of the magnet 278A is still in an engagement with the sensing area 273A of the sensor 273.

Then in FIG. 8F the field 276 of magnet 276A is engagement with the sensing area 272A of sensor 272 while the field 278 of magnet 278A has become disengaged from the sensing area 273A of the sensor 273.

The progression continues through FIG. 8H whereby a binary truth table is developed as shown in FIG. 16 illustrating various position of the element and the sensors actuated for each position. It can be appreciated from the truth table that each position has generated a unique binary word indicative of that position.

FIG. 9 is an illustration of a actuator element useful in devices of the type illustrated in FIG. 8A–8G where the moveable element 275 is shown with the magnet 276A which provides the field or span 276 and magnet 278A which provide the field or span 278 also shown.

The space L13 in the arrangement shown in FIG. 9 is occupied by a magnet 277A. In accordance with another feature of the present invention the magnets 276A, 278A have one pole, for example, a south pole directed downwardly (in arrangements where the actuation areas 271A–274A of sensors 271–274 are actuated by south pole) and the space corresponding generally to the distance L13 can be occupied by magnet 277A as shown where the magnet 277A is turned s to expose an opposite, in this case north, magnetic filed of proper width to the sensors. It has been found that such an arrangement can provide an efficient means of setting limits on the extent of the magnetic fields.

FIGS. 11A–11N, 12 and 13 illustrate yet another arrangement within the scope of the present invention utilizing four actuator devices, for example magnets of selected magnetic field widths to actut a row of sensors.

In the arrangements shown in FIGS. 11A–11N sensors 281–285 are shown and are located as previously described with reference to the other arrangements.

The sensors 281–285 have actuation areas which in the FIGS. 11A–11N are represented by the dotted lines 281A–285A showing that the actuation areas are approximately in the centers of the sensors.

The sensors 281–285 are mutually separated by a distance L20 as shown in FIG. 11A.

The connections of the sensors are typical of the type previously shown where certain of the sensors can be interconnected or where the sensors are connected directly to decode devices and can be provided with positive or negative pull up depending upon the characteristics of the particular sensor in the mode of operation.

Actuators spans 291–294 are provided, which can for example be a actuation span of a selected pole of a magnet of proper dimension for the actuation of the sensors 281–285.

The spans 291–294 respectively have lengths L21, L23, L25, and L27 as shown and the actuator spans are separated by the distances L22, L24, and L26.

Typically as previously described the proper actuation span and spaces between the actuation spans are functions of the distance L20 and the distances L25, L26 and L27 are of the same character as those shown in FIG. 8A–8J.

The additional spans 291 and 292 added in the present instance are mutually separated and are separated from the span 293. In each case the general formula for the distance is: [NL+ (a distance less than L)] for example, in the arrangement shown the spans 293 and 294 are similar to the spans shown in FIG. 8A et. seq. while the distance L24 is $\frac{3}{4}$L the distance L23 is $\frac{1}{4}$L, the distance L22 is $\frac{1}{4}$ L20, and the distance L21 is $\frac{1}{4}$ L20.

On the movement of an element which carries the actuator which generates the spans 291–294 in the direction shown in the FIGS. 11A–11N the truth table shown in FIG. 13 is generated and will be noted for each position a different binary code has been generated indicating the different positions within the different positions of the device. It will be known that with only five sensors a total of more than 14 positions (and theoretically 8 positions per magnet) can be generated. In the arrangement shown the positions are shown by the marks 302 which correspond to the leading edge of the span 294 at the generation of each additional position and the bracket 301 indicates that the positions are generated sequentially as the actuator span generators move in the direction shown.

Again FIG. 12 is an illustration of an element 290 which can be provided to be connected to the moveable element such as a shaft and which carries the magnets 291A–294A which generates the spans 291–294.

As previously described the spaces L22, L24, and L26, can be filled by means of magnets 295, 296, and 297 which are inverted with respect to the polarity of the magnets 291A–294A. As previously described the arrangement accomplishes specific turn on and turn off of the sensors in response to movement of the element.

FIGS. 14–17 illustrate other arrangements within the scope of the present invention utilizing different numbers of magnets. In FIGS. 14–17 the sensors 311–319, 321-329, 331-339, and 341-349, are located and spaced apart relation a distance L30 on the locator lines 369-373. It will be understood that each of the arrangements shown in FIG. 14-17 is a separate arrangement but the arrangements have been shown on equal centers to facilitate description and particularly to allow common usage of the distance L30 upon which the distances are computed.

As previously described each of the sensors 311-319 is provided with a sensing area 312-320 while the sensors 321-329 are provided with sensing areas 322-330 and so forth.

In FIG. 14 four magnetic fields 352, 353, 354, and 355 are provided by magnets (not shown) carried by a movable element 351 which is carried by a shaft or other device where position is to be indicated.

The distances L31, L33, L35, and L37 represent the lengths of the magnetic field 352-355 while the distances L32, L34, and L36 represent the spacings between the magnets. In FIG. 14 the distances which have been found to provide a workable system to provide approximately eight positions for each of sensors are:

| L31 | 1.25 L |
|---|---|
| L32 | .375 L |
| L33 | .25 L |
| L34 | .25 L |
| L35 | .25 L |
| L36 | .375 L |
| L37 | .75 L |

The distances between the magnet 352 to the other magnets can than be computed by the distances L32, L38, and L39 has integral numbers of the distance L30 and a fraction thereof.

In FIG. 15 a system is shown which has been found to satisfactorily indicate the position of the movable element 366 where approximately six positions are provided per sensor and where the distances of the magnetic field 356-359 are longer than in FIG. 14 and where the magnets are rearranged in that the longest and the second longest magnets are located intermediate the shorter magnetic fields 356 and 359 which are located on the outer edges of the movable element 366. The magnet lengths correspond to the distances L40, L42, L44, L46 while the spacings between the magnets correspond to the distances L41, L43, and L45.

The distances as shown can be in the following ratio with respect to the distance L30 are:

| L40 | .5(L30) |
|---|---|
| L41 | .375(L30) |
| L42 | 1.25(L30) |
| L43 | .5(L30) |
| L44 | .75(L30) |
| L45 | .5(L30) |
| L46 | .5(L30) |

FIG. 16 illustrates an arrangement where approximately four positions are provided by each of the sensors and where three magnetic fields are utilized the only difference being that the spacing is not quit as regular as with the spacing between positions is not quit as regular as with respect to the previously described systems.

In FIG. 16 magnet field 360-362 are provided by magnets (not shown) where the distances illustrated are for the magnet fields L47, L49, L51 in the spaces between the magnets are represented by the distances L48, and L50.

It will be understood that as previously described and also with reference to FIGS. 14, and 15 inverted pole magnets can be provided in the intermediate spaces in order to provide sharper resolution.

In the arrangement shown in FIG. 16 the distances can bear the following relationships:

| L47 | 1.25(L30) |
|---|---|
| L48 | .5(L30) |
| L49 | .75(L30) |
| L50 | .5(L30) |
| L51 | .25(L30) |

Finally, with respect to FIG. 17 yet another arrangement within the scope of the present invention is shown which provides similar characteristics to the arrangements shown in FIG. 16 except that the width of the magnetic fields are slightly different and the relationship can be as follows:

| L52 | 1.25(L30) |
|---|---|
| L53 | .5(L30) |
| L53 | .75(L30) |
| L54 | .625(L30) |
| L55 | .5(L30) |
| L56 | |

It has been found that the arrangement shown here facilitates the switching of the sensors at more precise positions thus enhancing the overall operation of the device and providing even better position resolution and uniformity.

In position transmitter arrangements illustrated in the accompanying drawings provide good results when used in devices in accordance with the present invention because as the element moves from one segment to the next, at least one sensor actuated in the first segment remains actuated when the actuation means moves to the next segment and one of the sensor means which was engaged in the first segment by one of the actuation means is disengaged in the next segment or a sensor which was inactive in the prior segment is activated. Proper sequencing is obtained by proper interrelation of the spacing and location of the actuation lengths of the actuation devices with reference to spacing between sensors.

In accordance with another feature of the present invention it has been found that the mode of digital control operation previously described with reference to position determination by magnetic devices is equally appropriate for use in optical devices which can also be utilized in digital position transmitters for control devices in accordance with the present invention.

Figures 18, 21:
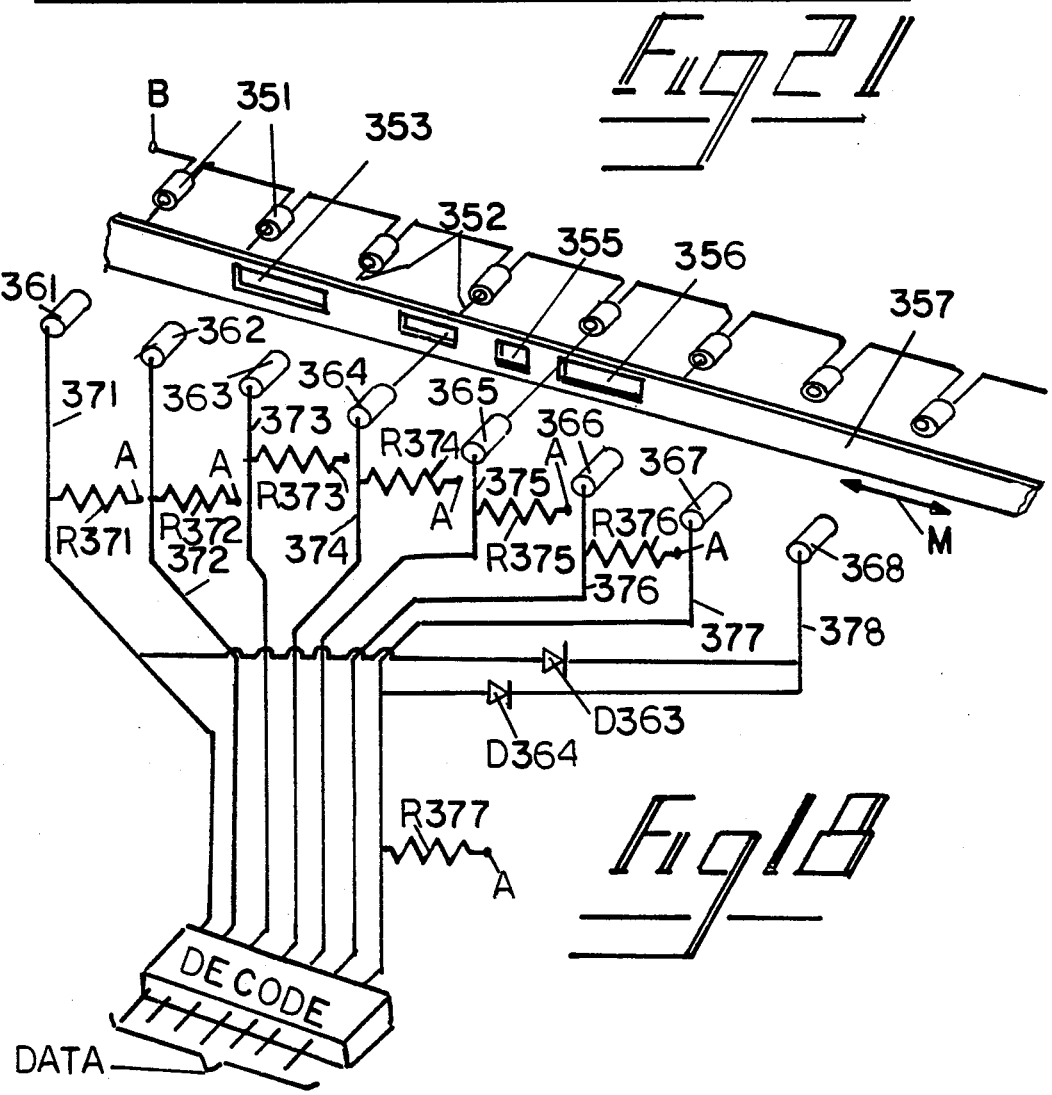
FIG. 18 illustrates another example of a position transmitter device useful in devices in accordance with the present invention.
FIG. 21 is a truth table illustrating sensor condition for the sequence of positions shown in FIGS. 20A-20J.

FIG. 18 is a schematic illustration of an example of an arrangement within the scope of the present invention utilizing an example of an optical system where sources or sources of electromagnetic energy such as infrared or visible light sources 351 are located in spaced relation on one side of slotted shutter 350. Slots 353, 354, 355, and 356 are provided in shutter 350 in appropriate length and spacing to operate as actuation means similar to the magnets in the prior examples as described hereinafter.

In the arrangement shown the length of the slots is selectively determined as described hereinafter to allow light beams from the sources 351 to pass through the apertures as the shutter moves along a path indicated by the arrow M in a pattern so that different sensors are actuated by the light passing through different slots for each increment of travel of the element which carries the shutter. Sensors, or detectors, 361–368 suitable to be actuated by the energy emitted from the sources 351 are provided on the opposite side of the shutter 350 and in aligned relation with the sources 351 to receive a beam of light which is directed through the slot when a shutter slot is in a selected aligned position with the source and detector.

For example in the arrangement shown in FIG. 24 the shutter is in position so the light beams pass through the aperture 354 and 356. As described with reference to previous embodiments of arrangements within the scope of the present invention the slotted shutter 350 can be carried by a element moveable between limits and the position of the element between the limits is indicated in increments of the travel path by the position of the shutter 350 a determined by the light beams passing through the shutters. Also the slots are of appropriate length and spacing to provide the desired resolution where the length and spacing of the slots is measured parallel to the travel path M and the slots, detectors and sources are located in paths to provide relative parallel movement as the element (not shown) moves along the travel path.

As previously described the output signals from the detectors 361–367 are provided to a decode device 400, for example, an Erasable Programmable Read Only Memory. Digital outputs 401 can be provided from the decode device to indicate the position of the element within the path of travel to be used as previously described to facilitate positioning of the element.

As also previously described with reference to previous arrangements, and in order to further reduce the number of conductors necessary to transmit signals selected of the detectors, for example in this case detector 368, having and output 379 can be provided through diodes D363, 364 to other of the outputs, in this case the output 371 of detector 361 and the output 376 of detector 366 in order to generate digital numbers from detectors which are not directly connected to the decode device. Also the input transmission lines 371–277 which are connected to the decode device can be biased from power supply A through resistors R371–R377 respectively to maintain the signal level on the input transmission lines when the no detector connected to the signal transmission line is in the active state.

FIGS. 19A–19C illustrate shutter arrangements within the scope of the present invention as previously described where the length of the slots in the shutter arrangement is the a function of distance L40 between the detectors, in this case between the associated detectors 361–368 and the light sources 351 as shown in FIG. 20A which is a cross sectional view of the arrangement shown in FIG. 18 and where the different sequences of a shutter of the type shown as shutter 350 are illustrated. In the arrangements shown in FIG. 19A a shutter having two slots 382, 383 is shown where the length of the slot 382 is equal to L50 while the space between the two slots is L51 and the length of the aperture 383 is L52. The length L50 in the arrangement shown can be equal to 1.25(L40) while the length L51 is 0.5(L40) and the length L52 is 0.75(L40).

FIG. 19B is an illustration of a shutter of the type shown in FIGS. 18 and 20A–20J where four slots 353–356 having lengths L53, L55, L57, and L59 with spacings L54, L56, and L58 between are provided in the shutter 357 and where the following relationships apply.

| L53 | 1.25(L40) |
| L54 | 0.5(L40) |
| L55 | .625(L40) |
| L56 | .75(L40) |
| L57 | .375(L40) |
| L58 | .375(L40) |
| L59 | 0.75(L40) |

It will be understood that in this arrangement as in others described herein other length and spacing relationships are useful and for example either the length or spacing can be increase by any multiple of the distance between the detectors and provide the same results.

Finally, in FIG. 19C is an illustration of a shutter 386 having slots 387–389 located therein where the following relation applies where L60 is the length of the aperture 387, L61 is the length of the space between slots 387 and 388, length L62 is the length of aperture 388, length L64 is the length of the distance between apertures 388 and 389 and L65 is the length of aperture 389. The following relationships apply in this case:

| L60 | 1.16(L40) |
| L61 | .33(L40) |
| L62 | .388(L40) |
| L64 | .5(L40) |
| L65 | .33(L40) |

It will be understood that in arrangements within the scope of the present invention a single light source could be utilized or the light sources can be utilized with columnated lenses in order to focus the light where appropriate as well a arrangements where the actuation means is a reflective strip and the source is located to reflect light or other electromagnetic radiation off the reflective strip to the detector to indicate position of the element.

Additionally, other aperture arrangements also within the scope of the present invention will occur to those skilled in the art upon reading the disclosure set forth hereinbefore.

Referring now to FIGS. 26A–26J sequential movement of the aperture sheet 357 through a portion of its range are illustrated. The detectors 361–368 are also illustrated where filled in detectors indicate the detector is on and the light beam is being directed from the source 351 through an aperture 2 and received by the detector. Where open circle detectors are illustrated the indication is that a light ray is not being received.

Additionally, the increments of movement are shown collectively by the reference numeral 391 at the ends of the extension lines drawn from the end of the aperture sheet at the end of each position.

The overall positioning and actuation pattern is shown in the truth table of FIG. 27 for the various positions 26A–26J where an "X" indicates that the detector is on while a "0" indicates that the respective detectors are off. Thus, the pattern of actuation of the detectors is clearly illustrated.

FIG. 22, is a schematic illustration of another controller arrangement within the scope of the present invention.

FIG. 22 illustrates a digital output position transmitter 404 of the type previously described where sensors 406 are provided in a travel path to be passed over by a rotor 407 which includes magnets (not shown) to generate a multi digit binary data set at each increment of the travel path. The data is transmitted by cable 408 to a decode device 409 for example an erasable programmable read only memory which then can provide the position designations. In the arrangement shown The program in the eprom generates binary coded position numbers for each position which includes position least significant digit PLSD and a position most significant digit PMSD. The position signals are transmitted to the data inputs of a pair comparators for example part number 74HC85. Comparator 411 is provided to receive least significant digits and the comparator 412 is provided to receive the most significant digits position data. A transfer function connection 413 is provided as is known in the art.

In the example shown position transmitter 404 is provided with a shaft 403 connected to a shaft 402 of an actuator 401 which has an output shaft 415 connected to a valve 418.

Actuator 401 is operated by two solenoid valves SV1 and SV2 which, in this case since actuator 401 is air to air, are 3-way normally open valves as is known in the art. Air is supplied from an air supply SA to the inlet port of each of the solenoid valves, which are normally open so that air pressure is continuously applied to opposite sides of the element (not shown) of the actuator 401. Solenoid valves SV1–SV2 are operated to exhaust position by means of solenoid SOL 1 & SOL2 respectively where power supply 423, which can be direct current electrical, is provided to each of the solenoids and where leads 425, 430 are provided from the solenoids SOL1 and SOL2 to transistors Q400 and Q401 connected to ground as shown. Transistors Q400 and Q401 are operated by the outputs 411A, 411B from the comparator 411 to the bases of the transistors. In the arrangement shown when one of the transistor, is gated by a control signal from the comparator 411 the transistors opens the solenoid lead to ground thus, allowing current to flow through the solenoid and moving the solenoid to the opposite position from that shown in the Figure. Thus, for example, if the solenoid associated with the solenoid valve SV2 is actuated by a signal on the output 411B then the solenoid moves the valve element so that air from the conduit 431 connected to on side of the actuator 411 is exhausted through the exhaust 432 and 453. As previously discussed a restrictor 453A could be provided in the exhaust port to allow restriction of the rate of loss of air from the actuator conduit 431 to regulate the speed of movement of the actuator element and the speed of movement of the valve member (not shown) in the valve 418. The restriction is done to allow the movement to be restricted to a speed which allows operation of the solenoid SV1 (or in the other case SV2) and equilibrium pressure to be established or either side of the element (not shown) of the actuator 401 while the actuator is in the segment of the travel path called for by the command signal as described hereinafter.

A similar arrangement is provided for solenoids SV1 to move the actuator in the opposite direction. As also shown the valve 418 is in a conduit 417 which receives a flow of fluid to be controlled where the flow is passed over a sensor 419 for example a resistance temperature detector (RTD). In the example shown resistance temperature detector 419 receives power from a reference source 423 through an adjusting resistor R401 and temperature compensating diode D421. The output from the resistance temperature detector 419 is grounded at G and the signal is connected through a reference resistor R402 to signal amplifier 424 to condition the signal. The gain of the amplifier is set by the value of the resistor R403, as is known in the art. To further stablize the signal a voltage follower buffer 426 can be provided in the output of amplifier 424 to provide a modified process signal 427 from the output 426 of the voltage follower buffer which is supplied to the noninverting inputs of comparators 441 and 443 and to the inverting inputs of comparators 442 and 444.

In the arrangement shown the comparators 443 and 444 control operation of a counter 416, as described hereinafter, to cause corrective movement of actuator 401 and valve 418.

Output 446, of the comparator 443, is supplied to the up/down input 448 of counter 416 and to a light emitting diode LED 401 which is on when output 446 is "Hi". Output 446 is also supplied through a diode D403 to a common junction 448 at the output of a diode D404 in the output 447 of the comparator 444, the output 447 can also be connected through a light emitting diode LED 402 to ground so the LED is on when the output 447 is high. An inverter 449 is provided to invert the signal at the common point. Thus, when output 447 and output 446 are both "Hi" so that there is a "Hi" signal at common point 448 so the signal supplied to the input 449 of the counter 416 is low. Alternatively, when the output 446 is low and the output 447 is likewise low the signal at the common point is "Lo" and a high signal is provided at the input 449 of the counter 416.

The inverting input of comparator 443 is connected to ground through adjusting potentiometer P402 supplied a reference voltage 436 where the adjustment of P402 sets the turn on/off point for output 446 relative to the likewise the noninverting input of comparator 444 is connected to ground through potentiometer P403 supplied reference voltage 436 and the setting of potentiometer P403 establishes the turn on/off point of the output 447 of comparator 444. Briefly, in the arrangement shown the potentiometers P401 and P402 so the upper and lower control limits as shown in FIG. 2 with the control range in between so long as the modified process signal 427 is in the control range the outputs of comparators 443 and 444 will be low.

In this condition the common point 448 is also "Lo" so inverter 449 supplies current to LED 403 to indicate that the process signal is within the control range. The "Hi" output from inverter 448 is also supplied to the enable input of an up-down counter 416 for example a part no CD4516 where it will be understood that the counter 416 can include a pair of the counters CD 4516 one for a least significant digit CLSD and one for a most significant digit CMSD with carryover between as is known in the art. The enable input 462 disables the counter 416 on a "Hi" signal so the counter is disables the counter 416 on a "Hi" signal so the counter is disabled when the process signal is in the control range.

When the process signal is out of the control range, either "Hi" or "Lo" then one of the comparators 443, 444 is on so the respective output 446, 447 is "Hi" and the common point 448 goes "Hi" so input 462 to counter 462 goes "Lo" to enable counter 416.

If the process signal goes out of range "Lo" that is if the process signal 427 falls below the lower control range limit set by the reference signal set by potentiometer 402 then comparator 443 goes "Hi". The "Hi" signal is supplied to the up/down input 461 of counter 416 to cause the counter output to increment the output data OD one count for each pulse received at clock onput 461 of counter 416 so long a input 461 is high and the counter is enabled by the "Lo" at input 462 as previously described. The output data OD which can be natural binary is supplied to a decode device 420 for example a programmable read only memory device to provide most significant digits CMSD and least significant digits CLSD which are supplied to the other set of data inputs to comparators 411 and 412. When there is no change in either inputs CMSD and CLSD or PLSD and PMSD then comparators 411 and 412 are balanced and output 411E is actuated so that light emitting diode LED 405 is actuated and there is no valve movement.

When an imbalance occurs, as when the counter output increments one count, one of the outputs 411A or 411B is actuated. As shown, the outputs are connected to gate transistors Q401 and Q402 respectively to operate the respective solenoid valves SV1 and SV2 to move the actuator shaft and the position transmitter shaft 407 so the position data PLSD and PMCD equal the counter data CLSD and CMSD. Thus, the valve 418 is moved in a corrective direction to modify flow through the valve 418 to alter the process condition in a corrective direction. So long as the process condition is below the lower control limit counter 416 continues to increment the output count CMSD and CLSD at a rate determined by the rate of pulses at input 463 as described later. When the process condition comes into the control range so the process signal 427 exceeds the lower control limit the output 446 of comparator 443 goes "Lo" so; with output 447 of comparator 444 "Lo" so; with output 447 of comparator 444 "Lo" the input 462 to counter 416 goes "Hi" to disable counter 416 and hold output count CLSD and CMSD at the correct valve to maintain the process condition.

On the other hand, if the process signal 427 exceeds the reference signal set by potentiometer P401, output 447 of comparator 444 goes "Hi".

This causes common point 448 to go "Hi" and input 462 to counter 416 to go "Lo" to enable the counter. Since output 446 from a comparator 442 is "Lo" the counter decrements output CLSD and CMSD one count for each pulse received at clock input 463. The new count is received at the data input of comparators 411 and 412 to actuate the appropriate output 411A, 411A (the other one than was actuated when the process condition fell below the lower counter range limit) and the associated transistor Q401, Q402 to operate the appropriate solenoid valve SV1, SV2 to cause actuator 401 to move valve 418 to modify the process condition and process signal 427 toward the control range movement of actuator shaft 415 is noted by position transmitter 404 so movement occurs until position data PLSD and PMSD equal counter output data CLSD and CMSD at which time the actuated output 411A or 411B is deactuated and movement stops.

In some cases the clock rate to clock input 463 of counter 416 can be fixed or, as shown in FIG. 22 the rate can vary depending on the extent of the deviation of the process signal from the control range.

In FIG. 22 two operational amplifiers 441 and 442 connected as summing amplifiers are provided. The modified process signal 427 is supplied to the inverting input of amplifier 442 and the noninverting input of amplifier 441. Potentiometers P403 and P404 are provided and supplied with reference voltage 436. The output 471 and 472° F. potentiometers 441 and 442 are connected through adjusting resistors R471 and R 472 to a common point 473. The common point is biased from a reference voltage RV through a dropping resistor to common point 473. Common point 473 is connected to the signal input 474 of a timer 477 for example an LM 358 having a variable capacitance rate adjustment VC-1. The valve of resistor R473 sets the minimum rate of pulses generated at output 476 of timer 477. The pulse rate at output 476 is then modified by the capacitance supplied by variable capacitor VC-1 and the changes in voltage at common point 473 resulting from amplifiers 441 and 442. The voltage at outputs 471, 472 vary with the difference in settings of potentiometers P403 and P404 and the process signal 427. Potentiometers P403 and P404 can be set so that the process signal deviation from control range both above and below setpoint. The gain of the amplifiers can be adjusted, as known in the art, to achieve desired characteristics. In any event, the valve of the input signal to input 474 varies in proportion to the deviation of the process signal from the control range and determines the pulse rate at output 476. Accordingly, the output 476 of voltage controller oscillator 479 is supplied to the input of a binary counter/divider 480 for example a part no. CD4020. Outputs Q8–Q14 are provided with terminals Qt8–Q14 and a plug 481 is supplied to be connected to one of the terminals Q8–Q14. A pulse is provided at output Q7 prior to output Q8 etc. in this case the counters of the counter/divider 480 is reset to "0" by a "Hi" on input 485. As shown the output Q7 (which is "on" before any of the outputs Q8–Q14) is connected to one input 486, of an "AND" gate 487. The other gate 488 is connected to plug 481 and to clock input 436 to counter 416. A light emitting diode LED 406 is also connected to input 436. The output 489 from and gate 487 is connected to the reset input 485 of counter/divider 480. Thus, after reset the outputs Q of counter divider 480 commence going high. Q7 goes "Hi" first then the outputs Q8–Q14. The plug 481 is connected to one of the terminals Q8–Q14 depending on the pulse rate desired. (The Q10 output providing a lower pulse rate at input 463 then Q14). When the Q8–Q14 output connected to the plug goes "Hi" a pulse is supplied to clock input 463 of counter 416. To adjust the output count CMSD and CLSD if the enable input 462 is "Lo" as previously described.

Simultaneously, LED 406 goes on and the output 489 of and gate 487 goes "Hi" thus, resetting outputs Q7–Q14 of counter/divider 480 to "0" for the next cycle.

The count period to counter 416 can be widely adjustable. The maximum reset period occurs when the process signal 467 is within the control range and the counter is latched. As the process signal varies further from the control range the reset period decreases so that the larger the deviation the faster the pulses and the more rapidly corrective action is taken.

The output signals from the signal summing amplifiers 441 and 442 are supplied to voltage controlled oscillator 477 which provides pulses at a rate proportional to the deviation of the control parameter signal from the set point. The output pulses are supplied to binary up-down counter 416. The output states of the comparators 443, 444 control the operating mode of the up/down counter 416, that is, whether the count (which occurs only when the control parameter signal is out of the control range) moves the counter output CMSD total up or down. For example when the control parameter is out of range on the high side the count would typically go down to lower flow in a value controlled application. The converse would occur when the control parameter signal is out of range to the low side. When the process signal is within range the outputs are latched so the output total from the counters do not change.

The maximum reset rate is selected to correspond generally to the response time of the system under control. In one example selection of Q11 gives a rate of one movement every 65 seconds with no added capacitance and 146 seconds with capacidance in the circuit. Typically, selection of Q10 would give a corresponding range of approximately 34 to 77 seconds.

The controller operates the positioner to provide proportional/reset/modified derivative control for a process variable such as pressure of temperature to modulate the controlled condition to provide desired system conditions as indicated by a set point supplied to the controller unit.

The controller operates by continuously comparing the control parameter with the set point and operating an actuator to position a control element such as a valve or damper to maintain the control parameter at the set point. The control parameter is continuously sensed by a sensor which is the variable element of a bridge circuit and the output signal is supplied to an amplifier and comparator circuit with adjustable set points.

It will be understood that the foregoing are but a few examples within the scope of the present invention and that other arrangements also within the scope of the present invention will occur to those skilled in the art upon reading the foregoing disclosure.

The invention claimed is:

1. A control device to control the position of shaft means moveable between first and second limits to operate regulator means in a corrective direction to control a process condition within a control range including:
   (a) feedback signal generator means to provide a process feedback signal reflective of said process condition;
   (b) set point generator means to generate first and second set point signals defining said control range between said first and second set point signals within which it is desired to maintain said process condition;
   (c) comparator means to compare said process feedback signal and said first set point signal and provide a first relation signal when said process feedback signal and said first set point signal are in selected relationship and compare said process feedback signal and said second set point signal to provide a second relation signal when said second set point signal and said process feedback signal are in selected relationship;
   (d) counter means having counter output means to provide a counter generated multidigit binary number output signal; input means to receive said first and second signals; clock means to increase said counter generated multidigit binary number output at selected rate in response to receipt of one of said first and second signals and to decrease said multidigit binary number output signal at selected rate in response to the other of said first and second signals;
   (e) binary number comparator means having first multidigit signal input means to receive said counter generated multidigit binary number output signal, second signal input means to receive a second mulitdigit binary number; first output means to provide an equal comparator signal when said counter generated multidigit binary number received at said first multidigit signal input means and said second multidigit binary number received at said second signal input means are equal, first mismatch comparator signal when said counter generated multidigit binary number received at said first signal input means exceeds said second multidigit binary number received at said second signal input means and second comparator mismatch signal when said counter generated multidigit binary number received at said first signal input means is exceeded by said second multidigit binary number received at said second signal input means;
   (f) position indicator means to indicate the position of said shaft between said first and second limits in segments of the travel path of the shaft where a different multidigit binary number is generated for each segment of the travel path where said shaft is operated by actuator means and moves in said travel path in first direction toward said first limit to operate said regulator means to adjust said process condition in a first direction and said actuator moves said shaft in said travel path in a second direction toward said second limit to operate said regulator means to adjust said process condition in a second direction wherein said position indicator means includes output means to generate said second multidigit binary numbers to said second signal input means in binary sequential order to indicate the position of said element in said travel path;
   (g) motive means to selectively operate said actuator to move said shaft and regulator means in said first and second directions;
   (h) motive means control means to receive said equal signal, said first mismatch signal and said second mismatch signal and operate said motive means to move said shaft in said first direction in response to one of said first and second mismatch signals and operate said motive means to move said shaft in said second direction in response to the other of said first and said second mismatch signals;

2. The invention of claim 1 wherein the rate of generation of change of said counter generated multidigit binary number is determined by said clock means.

3. The invention of claim 1 wherein said selected rate of counting of said counter means determined by said clock means changes at a rate proportional to the magnitude of the deviation of said feedback signal from at least one of said first and second set points.

4. The invention of claim 3 wherein the rate of change of said counter generated multidigit binary number in response to receipt of said first relation signal is different than the rate of change of said counter generated multigit binary number in response to receipt of said second relation signal.

5. The invention of claim 1 wherein said position indicator device for indicating the position of said shaft means includes:
   (a) first, second and third sensor means disposed in generally equal mutually spaced relation along a first path where said first, second and third sensors have actuation areas of selected length measured parallel to said first path and are operable between first state, in response to presence of actuator means located in said actuation area, and second state, in the absence of said actuator means in said actuating area, where each sensor means includes output signal means to provide first and second output signals in response to said first and second states of said sensors; and (b) sensor actuator means carried by said shaft element for movement in a second path parallel to said first path in response to movement of said shaft between said first and second limits where said actuator means is has an effective actuator span to operate said sensor means to said first state, and is continuously positioned in an actuating area of at least one of said first, second and third sensor means to operate the respective said sensor means to said first state where the length of said actuating span, in the direction of said first and second paths, is selected so said actuator sequentially engages the actuating area of said first sensor means then engages the actuating areas of said first and second sensors, than engages the actuating area of only said second sensor then engages the sensing areas of said second and third sensors as said moveable element moves in a first direction in said first travel path whereby said first and second output signals from said first, second and third sensors provide multibit binary indication of the position of said shaft in said travel path in segments of said travel path.

6. The invention of claim 5 wherein said sensor means are actuated when selected magnetic field is located within said sensing area and said actuator means is a magnet having a length to provide said actuator span.

7. The invention of claim 5 wherein said shaft is bidirectionally rotatable between first and second limits and wherein said actuator means is carried by rotor means carried by said shaft means for rotation therewith in an arc defining said second path and said sensor means are fixed in an arc defining said first path in spaced relation from said actuator means whereby said actuator means passes said sensor means as said shaft is rotated between said first and second limits or rotation.

8. The invention of claim 1 wherein said shaft is adapted to travel bidirectionally in an arc of travel of selected shaft arc angle between first and second limits and said indicator means includes:

(a) a first set of sensor means including at least first, second and third sensor means located in generally equally spaced relation along a first path where said sensors of said first set of sensors have actuation areas of selected length along said first sensor set arc and are operable to first state in response to presence of an actuator means located in said actuator area and operable to second state in the absence of said actuator means in said actuation area where each said sensor means includes output signal means to provide first and second signals in response to said first and second states of said sensors; and (b) a second set of sensor means including at least first, and second sensor means located in equally spaced relation along a second path wherein said second sensor set is separate from said first sensor set and where said sensors of said second set of sensors have actuation areas of selected length parallel to said second path and are operable to first state in response to presence of an actuator means located in said actuation area and operable to second state in the absence of said actuator means in said actuation area where each said sensor means includes output signal means to provide first and second signals in response to said first and second states of said sensors; and (c) first and second actuator means carried by said shaft means where said first actuator means is disposed to engage the sensing areas of said sensors of said first set of sensor means as said shaft moves, said second actuator means is disposed to engage said sensors of said second set of sensor means as said shaft moves where said first and second sensor means each has an actuation span less than the distance between the actuation areas of two adjacent sensors in said first and second sets of sensors and where said first and second actuator means are located for movement with said shaft so that said first actuator means engages said first sensor of said first set of sensor means and said second actuator is out of the sensing areas of said second set sensor means, then as said shaft moves in a first direction said second actuator means engages said sensing area of said first sensor of said second set means while said first actuator means is in engages said first sensor of said first sensor set and as said shaft moves further in said first direction said first actuator means engages the actuation area of no sensor of said first sensor set and said multidigit binary reference and said decoded binary position signals match and said comparator means provides neither said first or said second signals.

9. Position control means to selectively position a shaft operable between first and second limits in a multiplicity of selected position increments along a path of travel between said first and second limits where said shaft is carried by and moved by actuator means adapted to receive motive means to move said shaft bidirectionally between said limits and where said position control means includes:

(a) digital position indicator means operable in response to movement of said shaft to generate multidigit binary position signal for each position increment of said shaft between said first and second limits where a different multidigit binary position signal is generated for each position and decode means to provide decoded binary position signals in selected progressive order of value for said position increments between said first and second limits;

(b) set point signal generator means to generate multidigit binary digital reference signals in the same value range and format as said decoded binary position signals so selected of said decoded binary digital reference signals correspond to decoded binary position signals provided at selected shaft position increments between said first and second limits;

(c) comparator means to provide comparison of said decoded binary position signals and said multidigit binary reference signals where said comparator means has first signal inputs to receive said decoded binary position signals and second signal inputs to receive said decoded binary reference signals and comparing means to compare said decoded binary position signals and said multidigit binary reference signals and where said digital comparator means has first and second output means where said:
  (i) first output means provides a first direction signal when said decoded binary position signal and said multidigit binary reference signals do not match and said decoded binary position signal is of greater value than said multidigit binary reference signal; and
  (ii) said second output means provides a second direction signal when said decoded binary position signals and said multidigit binary reference signals do not match said decoded binary position signal is of less value than said multidigit binary reference signal;
(e) motive means supply means to supply said motive means to operate said actuator means; and,
(f) motive means supply means control means to receive said first and second direction signals and direct said motive means to operate said actuator means to move said shaft toward one of said first and second limits in response to said first direction signal, and direct said motive means to operate said actuator means to move said shaft toward the other of said first and second limits in response to said second direction signal and to terminate supply of said motive means and movement of said shaft when said multidigit binary reference and said decoded binary position signals match.

10. The invention of claim 9 wherein said shaft means operates regulator means to control selected process characteristic and further including set point generator means including process control means to receive a process signal indicative of said process characteristic which is controlled by movement of said regulator means wherein said process control means generates a control signal indicative of a position increment in which said shaft is to be located to achieve a desired value of said process characteristic and said process control means generates said multidigit binary reference signals.

11. The invention of claim 10 wherein said control signal is analog and said process control means includes decode means to generate said multidigit binary reference signals from said analog control signal.

12. The invention of claim 9 wherein said position indicator device to generate multidigit binary signals to indicate position increments of said shaft between said first and second limits along a travel path includes a selected number of sensors located in a sensor travel path where each sensor has an actuation area and each sensor is operable between first state in response to presence of sensor actuation means in said sensor actuation area and second state in absence of said actuation means in said actuation area; where said actuation means includes first sensor actuator means having first actuation length parallel to said sensor path and disposed to selectively engage the actuation areas of said sensors to actuate respective sensors to said first state where said sensors are located so there is a distance "L" between said actuation areas of adjacent sensors and where said first actuation length is equal to $(n+\frac{1}{2})L$ where "n" is an integer having a value of at least one and where said first actuator means and said sensor means are moved relative to each other with movement of the movable element along said travel path so that said first sensor actuator means continuously engages the actuation area of at least one sensor and alternately engages the sensor actuation area of at least two adjacent sensors to provide a first multidigit binary output signal according to the state of all said sensors when a first sensor of a first set of adjacent sensors is engaged by said first sensor actuator and a second multidigit binary output signal is provided according to the state of all said sensors when the first sensor of said first set of adjacent sensors and a second sensor adjacent the first set of sensors is engaged by said first sensor actuator means, a third multidigit binary output signal is provided according to the state of all said sensors when said first sensor actuator means disengages from one sensor of said first set of sensors but remains in engagement with the actuation area of the second sensor to indicate position of said element in said travel path in increments of said travel path.

13. The invention of claim 9 wherein said position indicator device for indicating the position increments of said shaft between said selected limits along a travel path includes a set of sensors including at least first, second, third and fourth sensors located in a sensor path where each sensor has an actuation area and each said sensor has output means operable between first state in response to presence of actuation means in said actuation area and second state in the absence of said actuation means in said actuation area; first and second sensor actuator means carried for movement parallel to said sensor path with first and second actuation means respectively to selectively engage actuation areas of said sensors where said sensors are located so there is a distance "L" between the actuation areas of adjacent sensors, measured parallel to said sensor path, and where said first actuation means has a first actuation length parallel to said sensor path equal to $[NL+X]$ where "N" is 1 or a whole integer and "X" is less than "L" and said second actuation means provides second actuation length, measured parallel to said sensor path, equal to $[(N_2)L+S]$ where $N_2$ is 0 or a whole integer and "S" is less than "L" but not equal to "X" and where said first and second actuation means are separated by a first distance "SD" equal to $[(N_3)L+D]$ where $N_3$ is "0" or a whole integer and "D" is less than "L" and not equal to "X" or "S" and the sensors and said first and second actuation means are moved relative to each other with movement of the shaft so that in each movement of said element from one increment of said travel path to a second increment of said travel path one sensor which is actuated by one of said first and second actuation means remains actuated by one of said first and second actuation means while a second sensor is engaged or disengaged by one of said first and second actuation means, and the state of all said sensors provides a multidigit binary number to indicate the then current incremental position of the element in the travel path.

14. The invention of claim 13 wherein "N" is 1; $N_2$ is 0; D is 0.5L; "S" is 0.75L; $N_3$ is "0"; and "X" is 0.25L so that as said moveable shaft moves in a first direction along said travel path:
  (a) said first actuation means engages said actuation area of a first sensor while said second actuation means engages the actuation area of second sensor in a first position then as said shaft moves to a second position;
  (b) said first actuation means engages the actuation area of said first sensor, said second actuation means is disengaged from the actuation area of said second sensor then as said shaft moves to a third position;

(c) said first actuator actuation means engages the actuation area of said first sensor means and said second actuation means engages the actuation area of a third sensor, then as said shaft moves to a fourth position;

(d) said first actuation means engages actuation areas of said first and second sensors while said second actuation means engages said actuation area of said third sensor then as said shaft moves to an fifth position;

(e) said first actuation means disengages from said actuation area of said first sensor and remains engaged with said actuation area of said second sensor while said second actuation means remains engaged with said actuation area of said third sensor means, then as said shaft moves to a sixth position;

(f) said first actuation means engages the actuation area of said second sensor and said second actuation means disengages from said actuation area of said third sensor;

15. The invention of claim 13 including at least said first, second, third, and fourth sensors and further including at least fifth and sixth sensors as well as at least first, second, third and fourth signal transmission means connected respectively to output signal means of said first, second, third and fourth sensor means to transmit signal states of said first, second, third, and fourth sensor output signals; signal maintenance means to normally maintain said at least first, second, third and fourth signal transmission means in said second states; signal flow direction limiting means connecting said output signal means of said sixth sensor to at least two of said first, second, third and fourth signal transmission means so said at least two of said first, second, third and fourth signal transmission means to which said sixth sensor signal output means is connected by said signal flow direction limiting means, are each operated to said first state when the output of said sixth sensor goes to said first state and are also operated to said first state by said output signal means of the respective first, second, third and fourth sensors to which the first, second, third, and fourth signal transmission means are connected and where the two of said first, second, third and fourth sensors having their output signal means connected to said signal transmission means to which said signal flow direction limiting means from said signal output means of said sixth sensor are connected are not located in said sensor path within two sensors of each other and neither of said at least two of said first, second, third, and fourth sensors is adjacent said sixth sensor whereby said at least two of said first, second third and fourth signal transmission means connected to said output signal means of said sixth sensor by said signal flow direction limiting means go to said first state when said output signal means of said sixth sensor is in said first state, and said signal flow direction limiting means prevents the occurrence of a first state signal on either of said at least two of said first, second, third or fourth signal transmission means connected to said sixth sensor by said signal flow direction limiting means from being transferred to other of of said at least two of said first, second, third, or fourth signal transmission means to which the output signal means of said sixth sensor is also connected by said signal flow direction limiting means.

16. The invention of claim 13 including third actuator means to move parallel to said sensor path with said first and second actuator means in response to movement of said shaft along said travel path to provide third actuation means having an actuation length parallel to said sensor path to actuate said sensors to said first state equal to $[(N_4)L+T]$ where $N_4$ is 0 or a whole integer and "T" is less than "L" and where said third actuation means is located a second distance 3D from the next closest side of one of said first and second actuation means where distance 3D is equal to $(N_5L+K)$ where $N_5$ is "0" or a whole integer and "K" is less than "L" and said first, second and third actuation lengths and said distances SD and 3D are selected so that as said first, second and third actuation means are moved in response to movement of said shaft the position of said shaft along said travel path is indicated in segments of the travel path by the state of all said sensors and where as said shaft moves from a first segment of the travel path to a second adjacent segment of the travel path at least one first sensor is engaged by one of said first, second and third actuation means and is in said first state, remains engaged by said one of said first, second and third actuation means and in said first state and when said shaft has moved to said second increment at least one sensor which was engaged by one of said first, second and third actuation means and was in said first state when said shaft was in said first segment is disengaged from one of said first, second and third actuation means and goes to said second state and where as said shaft moves to a third segment of said travel path adjacent said second segment a third sensor is engaged by one of said first, second and third actuation means and goes to said first state and one said sensor which was engaged by one of said first, second, and third actuation means when said element was in said second segment remain engaged by said one of said first, second and third actuation means.

17. The invention of claim 16 including fourth actuator means to provide fourth actuation means having an actuation length parallel to said sensor path to actuate said sensor means to said first state equal to $N_6) L+V]$ where $N_6$ is 0 or a whole integer and "V" is less than "L" wherein said first, second third and fourth actuation means are separated along said actuator means by first distance SD, second distance 3D, and third distance 4D where distance 4 D is equal to $(N_7L+M)$ where $N_7$ is "0" or a whole integer and "M" is less than L and where said first, second third and fourth actuation means and the location of said SD, 3D, and 4D distances between said first, second, third, and fourth actuation means are selected so that as said first, second, third, and fourth actuation means are moved in response to movement of said shaft the position of said shaft along said travel path is indicated in segments of the travel path by the state of said sensors and where as said shaft moves from a first segment of the travel path to a second adjacent segment of the travel at least one first sensor which is engaged by at least one of said first, second, third and fourth actuator means and is in said first state remains engaged by at least one of said at least one of said first, second, third, and fourth actuation means and in said first state and at least one second sensor which was engaged by one of said first, second, third and fourth actuation means and was in said first state when said shaft was in said first segment is disengaged from said one of said first, second, third and fourth actuation means and goes to said second state and where as said shaft moves to a third segment of said travel path adjacent s id second segment a third sensor which was not engaged by one of said first, second, third, or fourth actuation means when said element was in said second segment of said travel path is engaged by disengaged from one of said first, second, third and fourth actuation means and one sensor which was engaged by one of said first, second, third, and fourth actuation means when said element was in said second increment remains engaged by said one of said first, second, third and fourth actuation means and in said first state.

18. The invention of claim 15, wherein said sensors are engaged and actuated to said first state by magnetic fields located within said sensing area and said actuation means is a magnetic field of appropriate magnetic polarity to operate said sensor means to said first state.

19. The invention of claim 9 wherein said position indicator for indicating the position of a shaft adapted to travel bidirectionally in a path of travel between first and second limits includes:

(a) a shaft moveable bidirectionally between said first and second limits;

(b) a first set of sensor means including at least first, second and third sensors located along a first sensor path generally parallel to said path of travel in generally equal mutually spaced relation where said sensors of said first set of sensor have actuation areas and are operable between first state in response to presence of actuation means located in said actuation area and second state in the absence of said actuation means in said actuation area where each said sensor includes output signal means to provide first and second signals in response to said first and second states of said sensors; and (c) a second set of sensor means including at least first and second sensors located in equally spaced relation along a second sensor path generally parallel to said path of travel wherein said second sensor path is separate from said first sensor path and where said sensor means of said second set of sensors have actuation areas and are operable between first state in response to presence of an actuation means located in said actuation area and second state in the absence of said actuation means in said actuation area where each said sensor means of said second sensor set includes output signal means to provide first and second signals in response to said first and second states of said sensor means; and (d) first and second actuator means carried by said shaft means where said first actuator means is disposed to move parallel to said first sensor path in response to movement of said shaft where said first actuator means provides first actuation means of first actuation length parallel to said first path to engage the actuation areas of selected said sensors of said first set of sensors as said shaft moves, said second actuator means provides second actuation means of selected actuation length parallel to said second path to engage said actuation areas of selected sensors of said second set of sensors as said shaft moves and where said first and second actuator means are located for movement with said shaft so that said first actuation means engages said actuation area of said first sensor of said first set of sensors and said second actuation means is out of the actuation areas of the sensors of said second sensor set when said shaft means is in a first increment of travel, then as said shaft moves in a first direction to a second increment of travel said second actuation means engages said actuation area of said first sensors of said second sensor set while said first actuation means engages said actuation area of said first sensor of said first sensor set and as said shaft moves further in said first direction to a third increment of travel said first actuation means engages the actuation area of no sensors of said first sensor set and said second actuation means engages said actuation area of said first sensors of said second sensor set, and as said shaft moves further in said first direction to a fourth increment of travel said first actuation means engages said actuation area of said second sensor of said first sensor set while said second actuation means engages said actuation area of said first sensor of said second sensor set to indicate the position of said shaft in increments of the travel path in accordance with the state of said sensors.

20. The invention of claim 9 wherein said position indicator for indicating the position of a shaft adapted to travel bidirectionally in a path of travel of selected length between first and second limits in generally equal increments of said path of travel includes:

(a) a shaft movable bidirectionally between said first and second limits;

(b) a first set of sensors including at least first, second and third sensors located in a plane in generally equally spaced relation along a first sensor set path where said sensors of said first set of sensors have first actuation areas and are separated by a distance "L" and are operable to first state in response to presence of actuation means located in said first actuation area and operable to second state in the absence of said actuation means in said first actuation area where each said sensor includes output signal means to provide first and second signals in response to said first and second states of said sensors; and (c) a second set of sensors including first, and second sensors located in a plane in equally spaced relation along a second sensor path of selected second length where said spacing between said first and second sensors of said second set of sensors is generally equal to the spacing between said first and second sensors of said first set of sensors and wherein said second sensor set path is separate from said first sensor set path and where said sensors of said second set of sensors have actuation areas and are Operable to first state in response to presence of an actuator means means located in said actuation area and operable to second state in the absence of said actuator means in said actuation area where each said sensor include output signal means to provide first and second signals in response to said first and second states of said sensors; and (d) first and second actuator means carried by said shaft means where said first actuator means has a first actuation length equal to $N_{10}(L)+E)$ parallel to said first sensor set path where $N_{10}$ is 1 or a whole integer and "E" is less than "L" and said first actuator means is disposed to engage said first actuation areas of said sensors of said first set of sensors as said shaft moves in a first direction, and said second actuation means has a second actuation length equal to $(N_{11}(L)+F)$ parallel to said second sensor set path where $N_{11}$ is 0 or a whole integer not equal to 1 and "F" is less than "L" but not equal to E and is disposed to engage said actuation areas of said sensors of said first set of sensors as said shaft moves in said first direction and said first and second actuators are located in spaced relation.

21. The invention of claim 20 where said first and second actuator means are located for movement with said shaft and said first actuation length is selected so that when said shaft is in a first increment of travel said first actuation means engages said actuation area of said first sensor of said first set of sensors and said second actuation means is out of engagement with the actuation area of said sensors of said second set of sensors, then as said shaft moves in a first direction to a second increment of travel along said travel path said second actuation means engages said actuation area of said first sensor of said second set of sensors while said actuation means engages said first actuation area of said first sensor means of said first set of sensors and as said shaft moves further in said first direction to a third increment of travel along said travel path said first actuation means engages said actuation areas of said first and second sensors of said first set of sensors and said second actuation means engages said actuation area of said first sensor of said second sensor set, and as said shaft moves further in said first direction to a fourth increment of travel along said travel path said first actuation means moves out of engagement with said actuation area of said first sensor of said first sensor set and said first actuation means still engages said actuation area of said second sensor of said first set of sensors while said second actuation means engages said actuation area of said first sensor of said second sensor set, then as said shaft moves further in said first direction to a fifth increment of travel along said travel path said second actuation means moves out of engagement with said actuation area of said first sensor of said second sensor set and said first actuation means engages said actuation area of said second sensor of said first sensor set whereby binary signals are provided from said output signal mean of said first and second sensors of said first sensor set means and from said output signal means of said sensors of said second sensor set to provide a binary word indicative of the incremental position of said shaft means in said path of travel.

22. The invention of claim 21 where said first and second actuator means are located for movement with said shaft and said first actuation length is selected so that when said shaft is in a first increment of travel said first actuation means engages actuation area of at least one sensor of said first sensor set and said second actuation means is out of the actuation area of said sensors of said second sensor set then when said shaft moves in a first direction to a second increment of travel said second actuation means engages said actuation area of said first sensor of said second sensor set while said first actuation means engages said actuation area of said first sensor of said first sensor set and as said shaft moves further in said first direction to a third increment of travel said first actuation means engages the actuation area of said first sensor of said first sensor set and a second sensor of said first sensor set and said second actuation means engages said actuation area of said first sensor of said second sensor set, and as said shaft moves further in said first direction to a fourth increment of travel said first actuator means moves out of engagement with the actuation area of said first sensor of said first sensor set and still engages said actuation area of said second sensor of said first sensor set while said second actuation means engages said actuation of area of said first sensor of said second sensor set, then as said shaft moves further in said first direction to a fifth increment of travel said second actuation means moves out of engagement with said actuation area of said first sensor of said second sensor set and said first actuation means engages said second sensor of said first sensor set whereby said output signal means of said sensor means of said first and second sensor means set provide said binary digital signal indicative of the incremental position of said shaft means in said path of travel.

23. The invention of claim 9 wherein said device to generate multidigit binary signals to indicate the position of an element movable bidirectionally between selected limits along a travel path in generally equal increments of the travel path includes a selected number of selected energy sensitive sensors elements located in a sensor path where each sensor is actuated to first state in response to receipt of selected actuation energy and goes to second state in absence of said actuation energy; actuation energy source means to direct selected actuation energy to each said sensor; first actuator means, having first actuation means with first selected actuation length parallel to said sensor path, to allow transmission of said actuation energy from said source means to said sensor means when said actuation means is within selected locations relative to said sensor path to actuate respective sensor means to said first state where there is a distance "L" between said adjacent sensor means and where said first actuation length is equal to $(n+\frac{1}{2})L$ where "n" is an integer having a value of at least one and where said first actuation means and said sensor means are moved relative to each other with movement of said shaft so that said first actuation means continuously allows transmission of energy to at least one sensor means and alternately allows energy transmission to the sensor actuation area of at least two adjacent sensors to provide a first multidigit binary output signal according to the state of all said sensors so a first multidigit binary signal is generated by the state of all said sensors when a first sensor is engaged by said first actuation means and a second multidigit binary output signal is provided according to said state of said sensors when the first sensor of said first set of adjacent sensors and a second sensor adjacent sensors is engaged by said first actuation means, a third multidigit binary output signal is provided according to said state of said sensor means when said first actuation means is moved to prevent transmission of energy to first sensor means but allows transmission of energy to said second sensor means to indicate positions of said element in said travel path in increments of said travel path.

24. The invention of claim 23 wherein said source means and said sensor means are located in generally aligned relation said actuation means is an aperture transparent to said selected energy having a length equal to $(n+\frac{1}{2})L$ in a shutter means made of a material opaque to transmission of said selected energy having a length greater than the length of said sensor set.

25. The invention of claim 24 wherein said selected energy is electromagnetic radiation.

26. The invention of claim 24 wherein said selected energy is magnetic flux.

27. The invention of claim 23 wherein said actuation means is a material which is reflective of said electromagnetic radiation which is carried along a second path generally parallel to said sensor path and said source and said sensor means are located so that when said actuation means is in selected locations along said second path electromagnetic radiation from said source means is reflected to said sensor means by said material which has a length equal to $(n+\frac{1}{2})L$.

28. The invention of claim 9 wherein said device for indicating the position said shaft includes selected energy sensitive sensor means including at least first, second, third and fourth sensor means located in a sensor path where each said sensor means has output means operable between first state in response to exposure of said sensor to electromagnetic radiation and second state in the absence of said selected energy; first and second sensor actuator means moveable with said shaft means having first and second actuation means to selectively actuate respective sensor means where there is a distance "L" between adjacent sensor means measured along said sensor path and where said first actuation means has a first actuation length parallel to said sensor path to cause operation of said sensor means to said first state equal to [NL+X] where "N" is 1 or a whole integer and "X" is less than "L" and said second actuation means has second actuation length, measured parallel to said sensor path to cause said sensor to be actuated to said first state, equal to $[(N_2)L+S]$ where $N_2$ is 0 or a whole integer and "S" is less than "L" but not equal to "X" and where said first and second actuation means are located along a line parallel to said sensor path and are separated by a first distance "SD" equal to $[(N_3)L+D]$ where $N_3$ is "0" or a whole integer and "D" is less than "L" and the sensor and said actuator means are moved relative to each other parallel to said sensor path with movement of said shaft so that as said actuation means is moved from one segment of said travel path to the next at least one of said first and second actuation means which was actuated in the previous segment remains actuated so the state of all said sensor means provides a multidigit binary number to indicate incremental position of the shaft in the travel path.

29. The invention of claim 28 wherein said source means and said sensor means are located in generally aligned relation said actuation means is an aperture having a length equal to $(n+\frac{1}{2})L$ in a shutter means made of a material opaque to transmission of said selected energy having a length at least equal to the length of said sensor set.

30. The invention of claim 28 wherein said actuation means is a material which is reflective of said electromagnetic radiation which is carried along a second path generally parallel to said sensor path and said source and said sensor means are located so that when said actuation means is in selected locations along said second path electromagnetic radiation from said source means is reflected to said sensor means by said material.

31. The invention of claim 28 wherein said selected energy is electromagnetic radiation.

32. The invention of claim 28 wherein said selected energy is magnetic flux.

33. The invention of claim 28 including at least first, second, third and fourth, fifth and sixth sensors each having signal outputs means where said first, second, third, fourth, fifth, and sixth sensor means are located in said sensor path and separated from adjacent sensors by a distance "L" and further including at least first, second, third and fourth signal transmission means connected to said output means of said first, second, third, and fourth sensor means to transmit the signal state of said signal outputs of said first, second, third, and fourth output signal means; signal maintenance means to normally maintain said first, second, third and fourth signal transmission means in said second state; signal flow direction limiting means connecting said output signal means of said sixth sensor means to at least two of said first, second, third and fourth signal transmission means so said at least two of said first, second, third and fourth signal transmission means to which said sixth sensor signal output means are connected by said signal flow direction limiting means are each also operated to said first state by said output signal means of the respective first, second, third and fourth sensors to which the first, second, third or fourth signal transmission means are connected and where the two of said first, second, third and fourth sensors having their output signal means connected to said signal transmission means to which said signal flow direction limiting means from said signal output limiting means of said sixth sensor are connected are not located in said sensor path within two sensors of each other and neither of said at least two of said first, second, third, and fourth sensors is adjacent said sixth sensor whereby said at least two of said first, second third and fourth signal transmission means connected to said output signal means of said sixth sensor by said signal flow direction limiting means go to said first state when said output signal means of said sixth sensor is in said first state, and said signal flow direction limiting means prevents the occurrence of a first state signal on one of said at least two of said first, second, third or fourth signal transmission means connected to said sixth sensor means by said signal flow limiting means from being transferred to other of said at least two of said first, second, third, or fourth signal transmission means to which the output signal means of said sixth sensor is also connected by said signal flow direction limiting means.

34. The invention of claim 28 wherein said actuator means includes third actuation means to move parallel to said sensor path with said first and second actuation means in response to movement of said shaft where said third actuation means has third actuation length parallel to said sensor path to allow transmission of said selected energy from said source means to said sensor means when said actuation means is within selected locations relative to said sensor path to actuate said sensors to said first state equal to $[(N_4)L+T]$ where $N_4$ is 0 or a whole integer and "T" is less than "L" but not equal to "D" or "X" and where said third actuation means is located a distance 3D from the next closest side of one of said first and second actuation means and is located on said line parallel to said sensor path where said distance 3D is equal to $(N_7L+K)$ where $N_7$ is "0" or a whole integer and "K" is less than 1 and not equal to "D" and said first, second and third actuation lengths and first and second distances 5D and 3D are selected so that as said first, second and third actuation means are moved in response to movement of said shaft the position of said shaft is indicated by the state of all said sensors and where as said shaft moves from a first segment of the travel path to a second adjacent segment of the travel path at least one first sensor means, engaged by one of said first, second and third actuation means and in said first state, remains engaged by said one of said first, second and third actuation means and in said first state when said element has moved to said second increment, at least one second sensor which was engaged by one of said first, second and third actuation means and was in said first state when said element was in said first segment is disengaged from said one of said first, second and third actuation means and goes to said second state; as said shaft move to said second adjacent segment of said travel path and where as said shaft moves to a third segment of said travel path adjacent said second segment a third sensor is engaged by one of said first, second and third actuation means and goes to said first state and one said sensor which was engaged by one of said first, second and third actuation means when said shaft was in said second segment remains engaged by said one of said first, second and third actuation means and maintains said third sensor in said first state.

35. The invention of claim 28 including includes fourth actuation means located in alignment with said first, second, and third actuation means and has an actuation length parallel to said sensor path to allow transmission of said selected energy from said source means to said sensor means to actuate said sensor means to said first state equal to $[(N_5) L + V]$ where $N_5$ is 0 or a whole integer and "V" is less than "L" wherein said first, second, third and fourth actuation means are separated along said actuator means by first distance SD, second distance 3D, and third distance 4D where distance 4D is equal to $(N_6 L + M)$ where $N_6$ is "0" or a whole integer and "M" is less than L but not equal to "K" and where said first, second, third and fourth actuation means and the location of said SD, 3D, and 4D distances between said first, second, third, and fourth actuation means are selected so that as said actuator means is moved in response to movement of said shaft the position of said shaft is indicated in segments of the travel path by the state of said sensor means and where as said shaft moves from first segment of the travel path to a second adjacent segment of the travel at least one first sensor means which is engaged by at least one of said first, second, third and fourth actuator means and is in said first state remains engaged by said at least one of said first, second, third, and fourth actuation means and in said first state and at least one second sensor means which was engaged by one of said first, second, third and fourth actuation means and was in said first state when said shaft was in said first segment is disengaged from said one of said first, second, third and fourth actuation means and goes to said second state as said shaft moves to said second adjacent segment of said travel path; and where as said shaft moves to a third segment of said travel path adjacent said second segment a third sensor which was not engaged by one of said first, second, third or fourth actuation means when said shaft was in said next adjacent segment of said travel path is engaged by one of said first, second, third and fourth actuation means and goes to said first state and one sensor which was engaged by one of said first, second, third, and fourth actuation means when said shaft was in said second increment remains engaged by said one of said first, second, third and fourth actuation means and in said first state.

36. The invention of claim 9 wherein said device for indicating the position of a said shaft adapted to travel bidirectionally in a travel path between first and second limits when the position of the element in said travel path is indicated in generally equal segments of the first travel path including:

(a) sensor set means including at least first, second, third, fourth, and fifth selected energy sensitive sensor means disposed in generally equal, mutually spaced, relation along a sensor path where said first, second, third, fourth, and fifth sensors are operable between first state, in response to selected energy and second state, in the absence of said selected energy where each sensor means includes output signal means to provide first and second output signals in response to said first and second states of said sensor means; and (b) Selected energy source means to direct selected energy;

(c) first sensor actuation means carried by said movable element for movement in a third path parallel to said sensor path in response to movement of said shaft between said first and second limits where said actuation means actuation length parallel to said sensor path to allow transmission of said selected energy from said source means to said sensor means when said actuation means is within selected locations relative to said sensor path sensor means to said second state where said actuation length is greater than the distance between two adjacent sensors and less than the distance between of said first and third sensor means where said actuation means is positioned first to transmit said selected energy to only one sensor means then to the one sensor means and to an adjacent sensor means, then the only to the adjacent sensor means to operate said sensor means output means between said first state and second states whereby said actuation means sequentially engages the only said first sensor means then engages said first and second sensor means, than engages only said second sensor means than engages said second and third sensor means then engages only said third sensor means then engages said third and fourth sensor means then engages only said fourth sensor means then engages said fourth and fifth sensor means then engages only said fifth sensor as said movable element moves in a first direction in said first travel path whereby said output means provide multidigit binary signals to indicate the position of said movable element in said travel path in segments of said travel path.

37. The invention of claim 9 wherein said device for indicating the position of a shaft adapted to travel bidirectionally in a path of travel between first and second limits including:

(a) a shaft moveable bidirectionally between said first and second limits;

(b) selected energy source means to supply selected energy;

(c) a first set of selected energy responsive sensor means including at least first, second and third sensor means located along a first sensor path generally parallel to said path of travel in generally equally spaced relation where said sensor means of said first set of sensor are operable between first state in response to said selected energy and second state in the absence of said selected energy where each said sensor means includes output signal means to provide first and second signals in response to said first and second states of said sensors; and (d) a second set of selected radiation energy responsive sensor means including at least first and second sensor means located in equally spaced relation along a second sensor path generally parallel to said path of travel wherein said second sensor path is separate from said first sensor path where said sensor means of said second set of sensors are operable between first state in response to said selected energy and second state in the absence of said selected where each said sensor means of said second sensor set includes output signal means to provide first and second signals in response to said first and second states of said sensor means; and (e) first and second actuation means to allow transmission of said selected energy from said source to said sensors when said first and second actuation means are in selected locations relative to said sensor paths carried by said shaft means where said first actuator means is disposed to move parallel to said first sensor path in response to movement of said shaft where said first actuation means have first actuation length parallel to said first path sequentially transmit said selected energy to sensor means of said first set of sensor means as said shaft moves, said second actuation means have selected actuation length parallel to said second path to sequentially transmit said energy to sensor means of said second set of sensor means as said shaft moves so that said first actuation means directs energy to of said first sensor of said first set of sensor means and said second actuation means direct no energy to any of the sensor means of said second sensor set means when said shaft means is in a first increment of travel, then as said shaft moves in a first direction to a second increment of travel said second actuation means directs energy to said first sensor means of said second sensor set means while said first actuation means directs said energy to said first sensor means of said first sensor set, and as said shaft moves further in said first direction to a third increment of travel said first actuation means directs energy to no sensor means of said first sensor set and said second actuation means directs energy to said first sensor means of said second sensor set, and as said shaft moves further in said first direction to a fourth increment of travel said first actuation means directs energy to second sensor means of said first sensor set while said second actuation means directs energy to said first sensor means of said second sensor set to indicate the position of said shaft in increments of the travel path in accordance with the state of said sensor means.

38. The invention of claim 9 wherein said device for indicating the position of a shaft adapted to travel bidirectionally in a path of travel of selected length between first and second limits in generally equal increments of said path of travel includes:

(a) a shaft movable bidirectionally between said first and second limits;

(b) selected energy source means to supply selected energy;

(c) a first set of sensor means responsive to said selected energy including at least first, second and third sensor means located in generally equally spaced relation along a first sensor set path where said sensors of said first set of sensor means and are operable first state in response to receipt of to said energy and operable to second state in the absence of said radiation energy where each said sensor means includes output signal means to provide first and second signals in response to said first and second states of said sensors; and (d) a second set of sensor means responsive to said energy including first, and second sensor means located in equally spaced relation along a second sensor path of selected second length where said spacing between said first and second sensors of said second set of sensors is generally equal to the spacing between said first and second sensors of said first set of sensors and wherein said second sensor set path is separate from said first sensor set path and where said sensors of said second set of sensor means and are operable to first state in response to said energy and operable to second state in the absence of said energy where each said sensor means includes output signal means to provide first and second signals in response to said first and second states of said sensors; and (e) first and second actuation means carried by said shaft means to allow transmission of radiation energy from said source means to said sensor means when said first and second actuation means are in selected locations relative to said sensor paths where said first actuator means has a first actuation length parallel to said first sensor set path and is disposed to selectively transmit said radiation energy to said sensors of said first set of sensor means as said shaft moves in a first direction, and said second actuation means has a second actuation length parallel to said second sensor set path and is disposed to selectively transmit said energy to said sensors of said first set of sensor means as said shaft moves in said first direction and said first and second actuation means are located in spaced relation and where said first actuation length is greater than the distance between said sensor means of said first set of sensors but less than twice the distance between sensor means of said first set of sensor mean and where said second actuation length is less than the distance between sensor means of said second set of sensor means.

39. A control device to control the position of shaft means moveable between first and second limits to operate regulator means including:

(a) feedback signal generator means to provide a process feedback signal reflective of a process condition;

(b) set point generator means to generate set point signals defining a control range within which it is desired to maintain said process feedback signal;

(c) first command signal generator means to provide a first pulsed binary signal when said feedback signal exceeds said set point signal and second command signal generator means to provide a second pulsed binary signal when said set point signal exceeds said process feedback signal;

(d) counter means having binary counter output means to provide a counter generated multidigit binary number output signal and input means to receive said first and second command signals, where said counter generated multidigit binary number output is incremented in response to receipt of pulses of one of said first and second command signals and decremented in response to receipt of pulses of the other of said first and second signals;

(e) binary number comparator means having first signal input means to receive said counter generated multidigit binary number output signal, second signal input means to receive a second mulitdigit binary number, first output means to provide an equal comparator signal when said counter generated multidigit binary numbers received at said first signal input means and said second multidigit binary number at said second signal input means are equal, first mismatch signal when said multidigit binary number received at said first signal input means exceeds said second multidigit binary number received at second signal input means and second mismatch signal when said multidigit second binary number received at said second signal input means exceeds said multidigit binary number received at said first signal input means;

(f) position indicator means to indicate the position of said shaft between said first and second limits in segments of the travel path of the shaft where a different multidigit binary number is generated for each segment of the travel path where said shaft is carried by actuator means and moves in said travel path in first direction toward said first limit to operate said regulator means to adjust said process condition in a first direction and said shaft moves in said travel path in a second direction toward said second limit to operate said regulator means to adjust said process condition in a second direction wherein said position indicator means includes output means to generate said multidigit second binary number which is indicative of the position of said element in said travel path;

(g) motive means to selectively operate said actuator to move said shaft and regulator means in said first and second directions; and (h) control means to receive said equal signal, said first mismatch signal and said second mismatch signal and operate said motive means to move said element in said first direction in response to said first mismatch signal and operate said motive means to move said element in said second direction in response to said second mismatch signal.

* * * * *